US010585783B2

(12) United States Patent
Woo

(10) Patent No.: US 10,585,783 B2
(45) Date of Patent: Mar. 10, 2020

(54) INTEGRATED CIRCUIT AND APPLICATION PROCESSOR

(71) Applicant: SAMSUNG ELECTRONICS CO., LTD., Suwon-si, Gyeonggi-Do (KR)

(72) Inventor: Hyung-Il Woo, Uiwang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 136 days.

(21) Appl. No.: 15/614,715

(22) Filed: Jun. 6, 2017

(65) Prior Publication Data

US 2018/0095863 A1 Apr. 5, 2018

(30) Foreign Application Priority Data

Oct. 4, 2016 (KR) .................. 10-2016-0127544

(51) Int. Cl.
*G01R 31/28* (2006.01)
*G06F 11/36* (2006.01)
*G01R 31/317* (2006.01)
*G01R 31/3177* (2006.01)
*G06F 11/16* (2006.01)
*G06F 21/74* (2013.01)

(52) U.S. Cl.
CPC ...... *G06F 11/3656* (2013.01); *G01R 31/3177* (2013.01); *G01R 31/31705* (2013.01); *G06F 11/16* (2013.01); *G06F 11/362* (2013.01); *G06F 21/74* (2013.01)

(58) Field of Classification Search
CPC .... G06F 11/3656; G06F 11/16; G06F 11/362; G06F 21/74; G01R 31/31705; G01R 31/3177

USPC .................. 714/726, 731, 732, 733, 734, 74
See application file for complete search history.

(56) References Cited

U.S. PATENT DOCUMENTS

| | | | |
|---|---|---|---|
| 7,219,265 B2 | 5/2007 | Yee | |
| 7,958,399 B2 | 6/2011 | Glotzbach et al. | |
| 8,423,829 B2 | 4/2013 | Yamagata et al. | |
| 8,788,886 B2 | 7/2014 | Chong et al. | |
| 9,158,661 B2 | 10/2015 | Blaine et al. | |
| 2010/0174956 A1* | 7/2010 | Kawasaki ...... | G01R 31/318555 714/726 |
| 2013/0275824 A1 | 10/2013 | Tekumalla et al. | |
| 2014/0075255 A1* | 3/2014 | Lee .................... | G01R 31/3177 714/727 |
| 2014/0101500 A1* | 4/2014 | Bastimane ..... | G01R 31/318536 714/727 |
| 2015/0227410 A1 | 8/2015 | Jarrett et al. | |
| 2015/0293173 A1* | 10/2015 | Tsuboi ............. | G01R 31/3177 714/727 |

\* cited by examiner

*Primary Examiner* — Christine T. Tu
(74) *Attorney, Agent, or Firm* — Volentine, Whitt & Francos, PLLC

(57) ABSTRACT

An integrated circuit (IC) includes a plurality of intellectual properties (IPs), each of the plurality of IPs includes a test logic. A first memory controller provides user data received from at least one of the plurality of IPs to a first memory in a first operation mode. A scanner gathers debugging data from the test logics of the plurality of IPs in a second operation mode. And a second memory controller receives the debugging data from the scanner and provides the debugging data to the first memory in the second operation mode.

19 Claims, 18 Drawing Sheets

INTEGRATED CIRCUIT AND APPLICATION PROCESSOR

CROSS-REFERENCE TO RELATED APPLICATION

This application claims the benefit of Korean Patent Application No. 10-2016-0127544, filed on Oct. 4, 2016, in the Korean Intellectual Property Office, the disclosure of which is incorporated herein in its entirety by reference.

BACKGROUND

The disclosure relates to a semiconductor device, and more particularly, to an integrated circuit (IC) configured to gather and store debugging data, an application processor (AP), and an electronic device including the AP.

With an increase in the integration density of semiconductor chips, it would take much time and a lot of resources to test the semiconductor chips. A Design For Testability (DFT) technique has widely been used to maintain the quality of semiconductor chips and increase testing efficiency. A scan test technique may occupy a large part of the DFT technique. By using the scan test technique, errors in hardware and/or software of a System on Chip (SoC) may be debugged through a scandump method.

SUMMARY

The disclosure provides an integrated circuit (IC) configured to gather debugging data, for detecting an error occurrence region and correcting errors, and store the debugging data without using an external apparatus when an operational defect occurs.

According to an aspect of the disclosure, there is provided an IC including a plurality of intellectual properties (IPs), each of the plurality of IPs includes a test logic. A first memory controller provides user data received from at least one of the plurality of IPs to a first memory in a first operation mode. A scanner gathers debugging data from the test logics of the plurality of IPs in a second operation mode. And a second memory controller receives the debugging data from the scanner and provides the debugging data to the first memory in the second operation mode.

According to another aspect of the disclosure, there is provided an IC including a plurality of IPs, each of the plurality of IPs includes a scan chain. A bus transmits data between the plurality of IPs. A built-in scanner gathers scan data from the scan chain and transmits the scan data to a memory. A controller controls at least some of the plurality of IPs and the built-in scanner to enter a scan mode, in response to a scan request signal, and provides scan information to the built-in scanner.

According to another aspect of the disclosure, there is provided an application processor (AP) mounted on an electronic device including a memory. The AP includes a plurality of function blocks, each function block including a test logic. A controller outputs a scan mode signal, indicating an operation mode for gathering debugging data, and a scan control signal when an operational defect occurs in at least some of the plurality of functional blocks. A built-in scanner gathers the debugging data from the test logics included in the at least some function blocks, in response to the scan mode signal and the scan control signal, and transmits the gathered debugging data to the memory.

According to another aspect of the disclosure, there is provided an integrated circuit having a plurality of isolatable circuit devices that operate independently of one another. Each of the isolatable circuit devices includes self-testing circuitry. A debugging scanner circuit receives debugging data from the self-testing circuitry of a selected isolatable circuit device. And a memory controller stores the debugging data received by the debugging scanner circuit in a predetermined location of a memory device.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
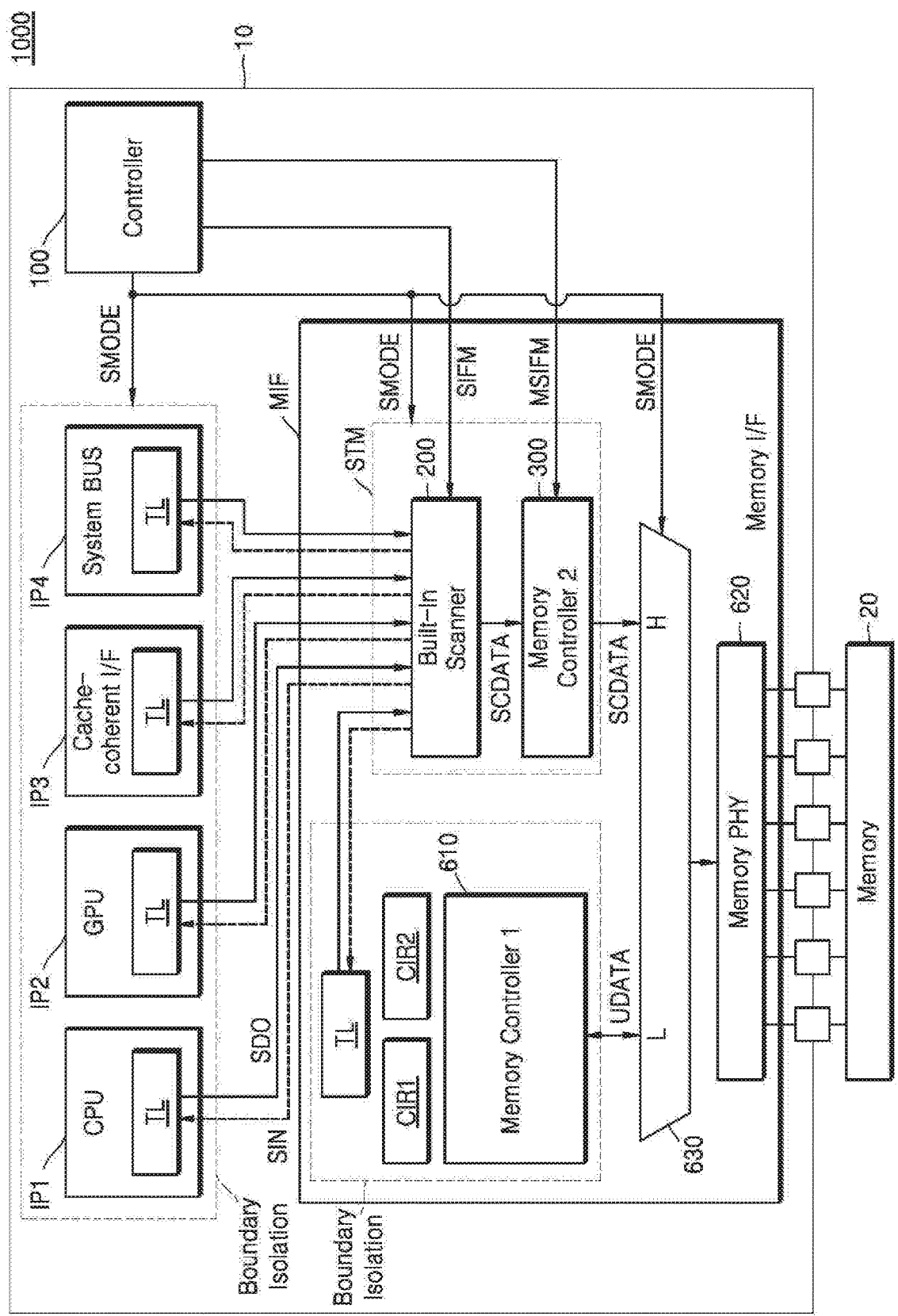
FIG. 1 is a block diagram of an electronic system according to an embodiment.

FIG. 1 is a block diagram of an electronic system 1000 according to an embodiment.

The electronic system 1000 may be mounted on an electronic device, such as a laptop computer, a smartphone, a tablet PC, a personal digital assistant (PDA), an enterprise digital assistant (EDA), a digital camera, a portable multimedia player (PMP), a portable navigation device (PND), a handheld game console, a mobile internet device (MID), a multimedia device, a wearable computer, an internet of things (IoT) device, an internet of everything (IoE) device, or an e-book.

Referring to FIG. 1, the electronic system 1000 may include an integrated circuit (IC) 10 and a memory 20. In addition, the electronic system 1000 may further include various types of components, such as a camera module, a display module, or a communication module.

In the electronic system 1000 according to the present embodiment, when a defect occurs in operation of the electronic system 1000 or when a defect occurs in operations of at least some of a plurality of intellectual properties (IPs) (e.g., first to fourth IPs IP1 to IP4) and a memory interface MIF included in the IC 10, a built-in scanner 200 included in the IC 10 may gather debugging data from all or some of the plurality of IPs IP1 to IP4 and the memory interface MIF, and a debugging-dedicated memory controller (e.g., the second memory controller 300) may store the debugging data in the memory 20. The debugging data may be used for a debugging operation of detecting an error occurrence region and correcting errors. In an embodiment, the debugging data may be state values of registers included in the IPs IP1 to IP4 and the memory interface MIF. The debugging data may be scan data SCDATA output by a scan chain formed by the registers along with test logics TL. In other words, the debugging data may be a snapshot of a IP. However, the disclosure is not limited thereto, and the debugging data may be various kinds of data indicating operation states of the IPs IP1 to IP4 and the memory interface MIF. Hereinafter, scan data SCDATA will be described as an example of debugging data for brevity.

The IC 10 may control an operation of the electronic system 1000. In some embodiments, the IC 10 may refer to a system on chip (SoC), an application processor (AP), a mobile AP, or a control chip.

The IC 10 may include a plurality of IPs (e.g., first to fourth IPs IP1 to IP4), a memory interface MIF, and a controller 100, and the memory interface MIF may include a first memory controller 610, a built-in scanner 200, and a second memory controller 300. Although FIG. 1 illustrates a case in which the built-in scanner 200 and the second memory controller 300 are located in the memory interface MIF, the disclosure is not limited thereto. The built-in scanner 200 and the memory controller 300 may be provided apart from the memory interface MIF.

Each of the IPs may be a function block integrated in the IC 10 and may include at least one of a central processing unit (CPU), a graphics processing unit (GPU), a processor, a microprocessor (MP), each core of a multi-core processor, a power management unit (PMU), a clock management unit (CMU), a cache-coherent interface, a system bus, a memory, a universal serial bus (USB), a peripheral component interconnect (PCI), a digital signal processor (DSP), a wired interface, a wireless interface, a controller, embedded software, a codec, a video module (e.g., a camera interface, a Joint Photographic Experts Group (JPEG) processor, and a video processor, or a mixer), a three-dimensional (3D) graphics core, an audio system, and a driver.

For example, as shown in FIG. 1, the IPs IP1 to IP4 may include at least one of a CPU, a GPU, a cache-coherent interface, and a system bus. The memory interface MIF may also be one of the IPs IP1 to IP4. However, the disclosure is not limited thereto, and the number and kinds of IPs may be variously changed.

Each of the IPs IP1 to IP4 may include a test logic TL. The test logic TL may output data indicating an operation state of the corresponding IP in a scan mode for gathering scan data SCDATA or a test mode for testing an operation of the IC 10. In this case, the scan mode may indicate an operation mode in which the IC 10 internally gathers scan data SCDATA without using an external apparatus. The test mode may indicate an operation mode in which an external apparatus provides a test input signal to the IC 10 and tests an operation state of the IC 10 in response to the input signal.

In an embodiment, each of the registers may include flip-flops. The test logic TL may be connected to the flip-flops and form a scan chain. The test logic TL may output scan data SCDATA indicating state values of the registers.

When a defect occurs in operation of the electronic system 1000 or when a defect occurs in operations of at least some of the IPs IP1 to IP4 and the memory interface MIF, the controller 100 may control general operations for gathering and storing scan data SCDATA and rebooting the electronic system 1000.

The controller 100 may be embodied by a program code for instructing the controller 100 to perform the above-described control operations and a microprocessor (MP) or another processor (e.g., a CPU) configured to execute the program code. The program code may be stored in the memory 20 or an embedded memory of the IC 10. For example, when a defect occurs in operation of the electronic system 1000 or when a defect occurs in operations of at least some of the IPs IP1 to IP4 and the memory interface MIF, a microcontroller (MC) may load and execute a program code and perform the above-described operations. However, the disclosure is not limited thereto, and the controller 100 may be embodied by hardware, software, or a combination thereof. In an embodiment, the controller 100 may be embodied by hardware, which is separated from the IPs IP1 to IP4 and the memory interface MIF.

The controller 100 may change an operation mode of the electronic system 1000 to the scan mode. The controller 100 may generate a scan mode signal SMODE indicating the scan mode, in response to a defect sense signal provided from the inside or outside of the IC 10. The controller 100 may provide the scan mode signal SMODE to the IPs IP1 to IP4 and the memory interface MIF. The controller 100 may provide other control signals to the IPs IP1 to IP4 and the memory interface MIF. Thus, the operation mode of the IC 10 may be changed to the scan mode.

When the IC 10 operates in a scan mode, the controller 100 may determine at least some of the IPs IP1 to IP4 and the memory interface MIF as IPs (hereinafter, referred to as target IPs) from which scan data SCDATA is to be gathered, and provide a control signal to block operations to the target IPs. In an embodiment, the controller 100 may determine all of the IPs IP1 to IP4 and the memory interface MIF as target IPs.

In addition, the controller 100 may isolate the target IP from other IPs in functional aspects. Even if any operation is performed in an isolated IP (or circuit), operation results may not affect other IPs or circuits. In an embodiment, a plurality of IPs (or circuits) that are closely related to one another in functional aspects may form a single function block, and the function block may be functionally isolated from other IPs or circuits. For example, the functional isolation of the function block from the other IPs or circuits may be referred to as boundary isolation. As can be seen from FIG. 1, all of the IPs IP1 to IP4 may be isolated from one another.

The controller 100 may control the built-in scanner 200 and the second memory controller 300 included in the memory interface MIF to gather scan data SCDATA and store the scan data SCDATA in the memory 20. To this end, the controller 100 may provide scan information SIFM to the built-in scanner 200 and provide memory setting information MSIFM to the second memory controller 300.

In addition, after the scan data SCDATA is stored in the memory 20, the controller 100 may control the electronic system 1000 to be rebooted or reset so that the electronic system 1000 may normally operate.

The memory interface MIF may transmit data to the memory 20 or receive read data from the memory 20. The memory interface MIF may communicate with other IPs through a system bus (e.g., the fourth IP IP4).

The memory interface MIF may include the first memory controller 610, the built-in scanner 200, the second memory controller 300, a test logic TL, a memory physical layer 620, and a selector 630. Also, the memory interface MIF may further include a plurality of function circuits (e.g., function circuits CIR1 and CIR2).

The first memory controller 610 may receive data from the memory 20 or transmit data to the memory 20. When the IC 10 operates in a normal mode, the first memory controller 610 may receive data from other IPs through the system bus and transmit read data from the memory 20 to other IPs. In an operation of transmitting and receiving data, a plurality of function circuits CIR1 and CIR2 may operate.

The built-in scanner 200 and the second memory controller 300 may be embodied by a single module STM and enabled in response to a scan mode signal SMODE provided by the controller 100. When the IC 10 operates in the scan mode, the built-in scanner 200 may gather scan data SCDATA from the test logic TL included in at least one of the IPs IP1 to IP4 and the memory interface MIF. The built-in scanner 200 may gather scan data SCDATA from at least some or all of the IPs IP1 to IP4 and the memory interface MIF, based on scan information SIFM provided by the controller 100.

The built-in scanner 200 may be point-to-point connected to each of the IPs IP1 to IP4 and the test logics TL of the memory interface MIF. The built-in scanner 200 may receive scan data SCDATA by point-to-point connections. The built-in scanner 200 may provide a scan input signal SIN to the test logic TL, and receive scan output data SDO from the test logic TL in response to the scan input signal SIN. For example, the scan input signal SIN may include a scan clock signal, scan input data, and a scan enable signal. The built-in scanner 200 may receive scan output data SDO from the test logic TL included in at least one of the IPs IP1 to IP4 and the memory interface MIF and transmit the scan output data SDO as scan data SCDATA to the second memory controller 200.

The built-in scanner 200 may convert a format of scan data SCDATA into a format appropriate for a protocol of the second memory controller 300. For example, the built-in scanner 200 may gather scan data SCDATA from other IPs through a Joint Test Action Group (JTAG) protocol. The second memory controller 300 may receive data through an Advanced eXtensible Interface (AXI™) protocol. The built-in scanner 200 may convert a format of the gathered scan data SCDATA into a format appropriate for the AXI™ protocol. However, the disclosure is not limited thereto, and a protocol between the built-in scanner 200 and other IPs and a protocol for the second memory controller 300 may be variously determined.

In the present embodiment, the built-in scanner 200 may transmit the gathered scan data SCDATA to the memory 20 without using IPs that operate in a normal mode. In other words, the built-in scanner 200 may transmit the scan data SCDATA to the memory 20 without using other IPs (e.g., a bus or the first memory controller 610).

To this end, the memory interface MIF may include the second memory controller 300 that operates in the scan mode. In the scan mode, the second memory controller 300 may transmit scan data SCDATA from the built-in scanner 200 to the memory 20.

For example, the IPs IP1 to IP4 may include the first memory controller 610 or the system bus (e.g., the fourth IP IP4). When all the IPs IP1 to IP4 are target IPs, operations of the first memory controller 610 or the system bus may be stopped in the scan mode. The built-in scanner 200 may transmit scan data SCDATA to the memory 20 through the second memory controller 300, which is set only for the scan mode, so that the scan data SCDATA may be stably stored in the memory 20.

However, the disclosure is not limited thereto. In another embodiment, the built-in scanner 200 may transmit scan data SCDATA to the memory 20 through other IPs (e.g., the system bus or the first memory controller 610), as described below with reference to FIGS. 8 to 10.

The selector 630 may select one of the first memory controller 610 and the second memory controller 300 in response to a scan mode signal SMODE and connect the selected memory controller to the memory physical layer 620. For example, the selector 630 may select the second memory controller 300 when the scan mode signal SMODE is logic high H, and select the first memory controller 610 when the scan mode signal SMODE is logic low L. Accordingly, the first memory controller 610 may have the authority to control the memory physical layer 620 and the memory 20 in the normal mode, and the second memory controller 300 may have the authority to control the memory physical layer 620 and the memory 20 in the scan mode.

The memory controller selected out of the first memory controller 610 and the second memory controller 300 may set up the memory physical layer 620 and the memory 20. For example, the selected memory controller may reset (e.g., software-reset) a memory, set a timing parameter and a memory configuration, and perform ZQ calibration. Also, the selected memory controller may set a timing parameter of the memory physical layer 620 and control a lock state and sink. Since the setting up of the memory physical layer 620 and the memory 20 by the memory controller is apparent to one of ordinary skill in the art, detailed descriptions thereof will be omitted.

In a normal mode, the memory physical layer 620 may be set up by the first memory controller 610 and transmit user data UDATA received from the first memory controller 610 to the memory 20 or provide read data received from the memory 20 to the first memory controller 610. In a scan mode, the memory physical layer 620 may be set up by the second memory controller 300 and transmit scan data SCDATA received from the second memory controller 300 to the memory 20.

In the scan mode, the built-in scanner 200 may gather scan data SCDATA based on scan information SIFM, and the second memory controller 300 may set up the memory 20 and the memory physical layer 620 based on memory setting information MSIFM. The built-in scanner 200 may gather scan data SCDATA from the IPs after the second memory controller 300 finishes setting up the memory 20 and the memory physical layer 620.

Meanwhile, in the scan mode, the first memory controller 610 and the function circuits CIR1 and CIR2 may also correspond to target IPs. The first memory controller 610 and the function circuits CIR1 and CIR2 may be boundary-isolated from one another so as not to affect operations of the built-in scanner 200. The built-in scanner 200 may receive scan data SCDATA regarding the first memory controller 610 and the plurality of function circuits CIR1 and CIR2 from the test logic TL.

The memory 20 may be provided as a storage medium of the electronic system 1000. Also, the memory 20 may store scan data SCDATA provided by the built-in scanner 200. The memory 20 may be located outside the IC 10. The memory 20 may store application programs, an operating system (OS) image, and various kinds of data. The memory 20 may include a memory card, such as a multimedia card (MMC), an embedded MMC (eMMC) card, a secure digital (SD) card, a microSD card, or a universal flash storage (UFS) card. Also, the memory 20 may include a volatile memory (e.g., dynamic random access memory (DRAM) and static random access memory (SRAM)), a flash memory, or a non-volatile memory (e.g., phase-change RAM (PRAM), magnetic RAM (MRAM), resistive RAM (ReRAM), and ferroelectrics RAM (FRAM)). Although the present embodiment illustrates a case in which the memory 20 is provided outside the IC 10, the disclosure is not limited thereto. In another embodiment, the memory 20 may be an embedded memory provided in the IC 10.

As described above, in the electronic system 1000 according to the present embodiment, when a defect occurs in operation of the electronic system 1000 or when a defect occurs in operations of at least some of the IPs IP1 to IP4 included in the IC 10, the built-in scanner 200 may gather scan data SCDATA and store the scan data SCDATA in the memory 20 without using an external device. Thus, when an operational defect occurs, the electronic system 1000 may store a snap shot (i.e., scan data SCDATA) of the IC 10 in a small amount of time without external environmental restrictions, and the accuracy of the scan data SCDATA may be improved. Also, when a debugging operation is performed by using scan data SCDATA stored in the memory 20, the time taken to reproduce a defect generation status may be reduced.

In the electronic system 1000 according to the present embodiment, the second memory controller 300 may store scan data SCDATA in the memory 20 in the scan mode. In this case, the built-in scanner 200 may gather and store scan data SCDATA without using the system bus (e.g., the fourth IP IP4) and the first memory controller 610. Accordingly, even if an operational defect of the IC 10 occurs in the first memory controller 610 or the system bus, the scan data SCDATA may be normally stored in the memory 20.

Figure 2:
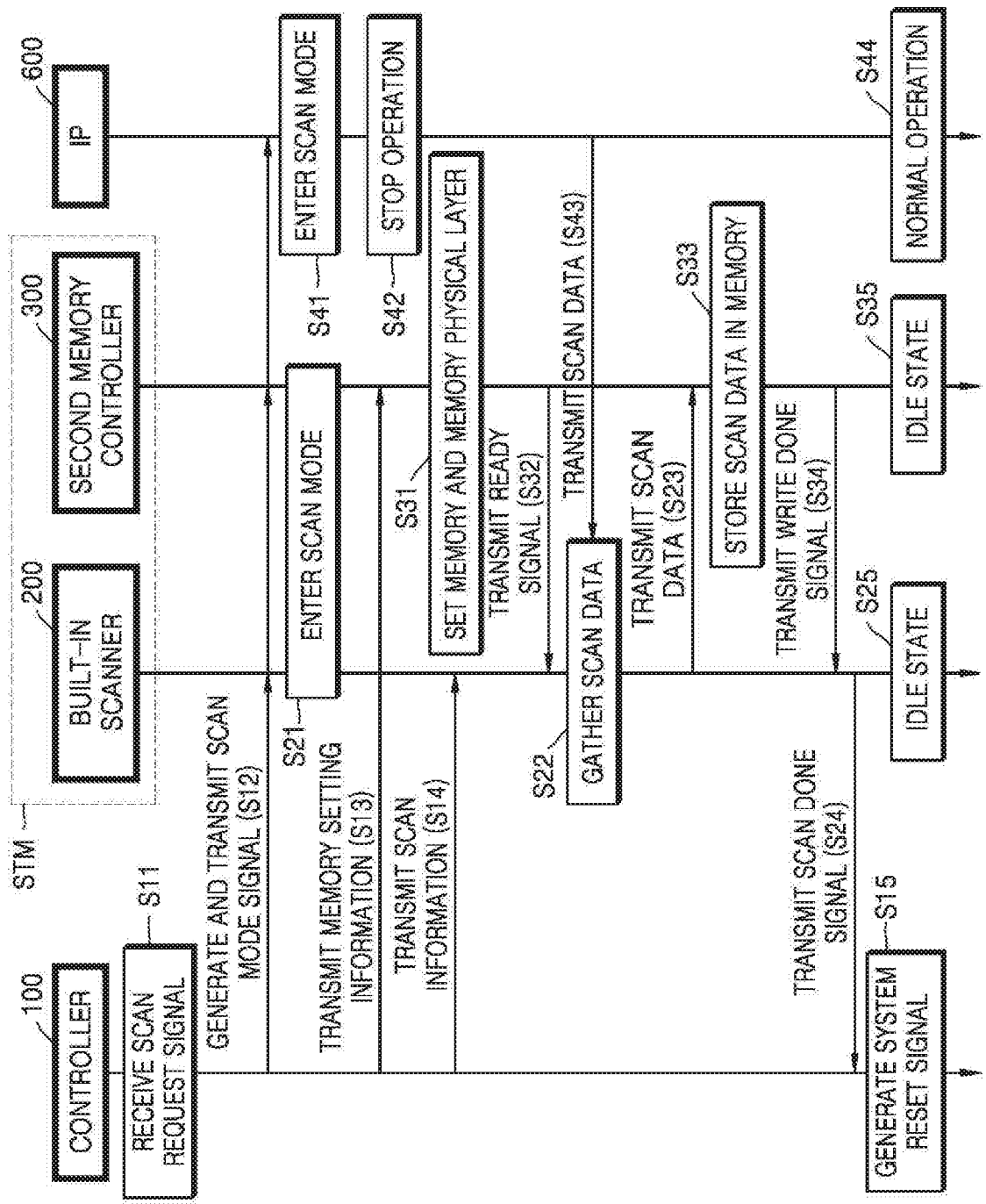
FIG. 2 is a flowchart of an operation of an integrated circuit (IC) in a scan mode, according to an embodiment.

FIG. 2 is a flowchart of an operation of an IC according to an embodiment. FIG. 2 is a diagram of an operation of the IC 10 shown in FIG. 1 in a scan mode. Specifically, FIG. 2 illustrates operations of the built-in scanner 200, the second memory controller 300, the controller 100, and a target IP 600. In FIG. 2, the target IP 600 refers to a target IP from which scan data SCDATA is to be gathered, among the IPs included in the IC (refer to 10 in FIG. 1). The target IP 600 may include one IP or a plurality of IPs.

Referring to FIG. 2, the controller 100 may receive a scan request signal (S11). When an operational defect occurs in the IC 10, a scan request signal may be generated by a defect generation sensing circuit included in the IC 10 or under the control of an external device located outside the IC 10, and the controller 100 may receive the scan request signal.

The controller 100 may generate a scan mode signal and transmit the scan mode signal to the built-in scanner 200, the second memory controller 300, and the target IP 600 in response to the scan request signal (S12). The controller 100 may determine at least some of the IPs included in the IC 10 as target IPs, and transmit a scan mode signal to the target IPs or a function block including the target IPs.

The IC 10 may enter the scan mode in response to the scan mode signal. The built-in scanner 200 and the second memory controller 300 may enter the scan mode (S21). Thus, a clock signal having a fixed frequency may be provided to the second memory controller 300 and the built-in scanner 200. In an embodiment, a debugging-dedicated clock generator included in the memory interface (refer to MIF in FIG. 1) may provide the clock signal having a fixed frequency to the second memory controller 300 and the built-in scanner 200.

The second memory controller 300 may have the authority to control a memory physical layer and a memory and wait for an instruction from the built-in scanner 200.

The target IP 600 may also enter the scan mode (S41). The application of a function clock signal to the target IP 600 may be stopped, and the target IP 600 or a function block including the target IP 600 may be boundary-isolated. An operation of the target IP 600 may be stopped (S42). Thus, data indicating an operational state of the target IP 600 may be stored in a register included in the target IP 600.

Thus, when the IC 10 enters the scan mode, the controller 100 may transmit memory setting information to the second memory controller 300 (S13). For example, the memory setting information may include setup information for setting up the memory (refer to 20 in FIG. 1) and the memory physical layer (refer to 620 in FIG. 1). The controller 100 may also transmit scan information SIFM to the built-in scanner 200 (S14). For example, the scan information SIFM may include information of the target IP 600, information regarding a test logic TL of the target IP 600 (e.g., length information of a scan chain), and address information of a region of the memory in which scan data SCDATA will be stored. Operations S13 and S14 may be performed simultaneously or in a changed order.

The second memory controller 300 may set up a memory and a memory physical layer based on the memory setting information (S31). For example, the second memory controller 300 may reset (e.g., software-reset) the memory, set a timing parameter and a memory configuration, and perform ZQ calibration. Also, the second memory controller 300 may set a timing parameter of the memory physical layer and control a lock state and sink.

After the memory and the memory physical layer are set up, the second memory controller 300 may transmit a ready signal to the built-in scanner 200 (S32). After confirming that the second memory controller 300 is ready, the built-in scanner 200 may gather scan data (S22). The built-in scanner 200 may provide a scan clock signal, a scan input signal, and a scan enable signal to the test logic TL included in the target IP 600. Scan data may be output from the test logic TL of the target IP 600 based on the scan clock signal, the scan input signal, and the scan enable signal. The target IP 600 may transmit scan data to the built-in scanner 200 (S43). The built-in scanner 200 may gather scan data SCDATA from a plurality of target IPs 600 (e.g., all or at least some of IPs including the test logic TL).

The built-in scanner 200 may transmit the gathered scan data to the second memory controller 300 (S23). The built-in scanner 200 may transmit the scan data in units of a data size corresponding to a predetermined protocol to the second memory controller 300. For example, the built-in scanner 200 may convert a format of scan data into a format appropriate for the protocol and transmit the converted scan data to the second memory controller 300.

The second memory controller 300 may write scan data to the memory (S33). The second memory controller 300 may write scan data to the memory providing a write command, scan data, and address information of a region in which the scan data will be stored to the memory through a memory physical layer.

If the scan data is completely written, the memory may store the written scan data. For example, the memory may enter a self-refresh power down mode and store the written scan data.

If the scan data is completely written, the second memory controller 300 may transmit a write done signal to the built-in scanner 200 (S34). If the built-in scanner 200 receives the write done signal, the built-in scanner 200 may determine that the scan data is stored in the memory 20, and transmit a scan done signal to the controller 100 (S24).

A system reset signal may be generated in response to the scan done signal (S15). Although FIG. 2 illustrates a case in which the controller 100 generates a system reset signal, the disclosure is not limited thereto. As described below with reference to FIGS. 5A and 5B, the PMU (refer to 400 in FIG. 5) may generate a system reset signal. Alternatively, when there is another component configured to control a general operation of the IC 10, the component may generate a system reset signal.

The IC 10 may be reset in response to the system reset signal and operate in a normal mode. The target IP 600 may perform a normal operation (S44). In this case, the built-in scanner 200 may be disabled. For example, the built-in scanner 200 may be in an idle state (S25). The second memory controller 300 may also be put into an idle state (S35). For example, when the second memory controller 300 is embodied by hardware, the controller 100 may be disabled or operate in a low-power mode. However, the disclosure is not limited thereto. When the controller 100 is embodied by software or a processor, the processor may perform a normal operation.

Figure 3:
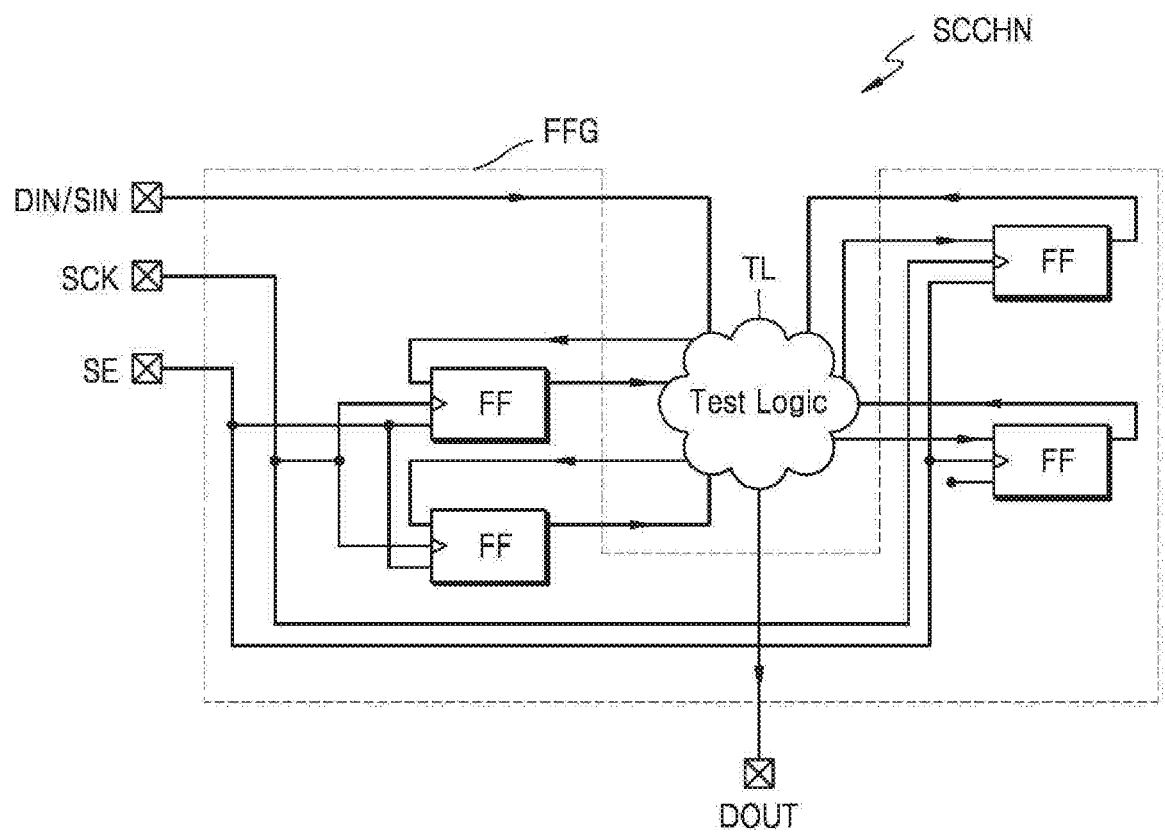
FIG. 3 is a diagram of an example of a scan chain including a test logic.

FIG. 3 is a diagram of an example of a scan chain SCCHN including a test logic TL.

The scan chain SCCHN may be included in a plurality of IPs (e.g., IP1 to IP4 of FIG. 4). Referring to FIG. 3, the scan chain SCCHN may include a flip-flop group FFG and a test logic TL.

The flip-flop group FFG may include a plurality of flip-flops FF. The flip-flops FF may be scan flip-flops. The flip-flops FF may be multi-bit flip-flops. The flip-flop group FFG may constitute a register. Each of the flip-flops FF may exchange data with the test logic TL in response to a scan clock signal SCK. Also, data of each of the flip-flops FF may be shifted in response to the scan clock signal SCK. The test logic TL may be embodied by a synchronous circuit or a nonsynchronous circuit. The test logic TL may process input data DIN or scan input data SIN and output output data DOUT corresponding to a processing result. The output data DOUT may be referred to as scan data.

Debugging data according to the present embodiment may be scan data output by the above-described scan chain SCCHN. However, the disclosure is not limited thereto, and the debugging data may be various kinds of data indicating operation states of the IPs IP1 to IP4.

For brevity, it will be assumed that the debugging data according to the present embodiment is scan data.

Figure 4A:
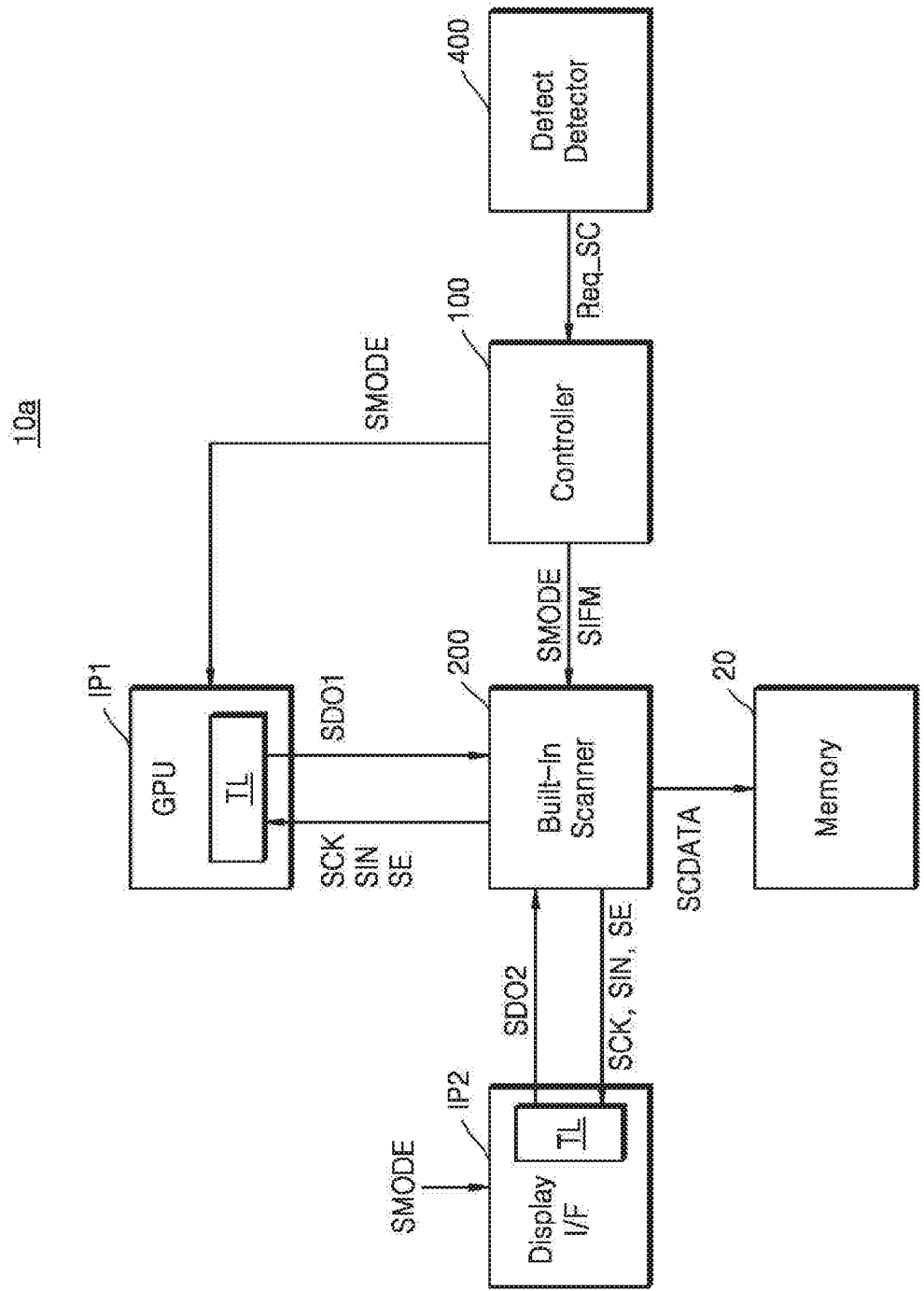
FIG. 4A is a block diagram of an IC according to an embodiment.
Figure 4B:
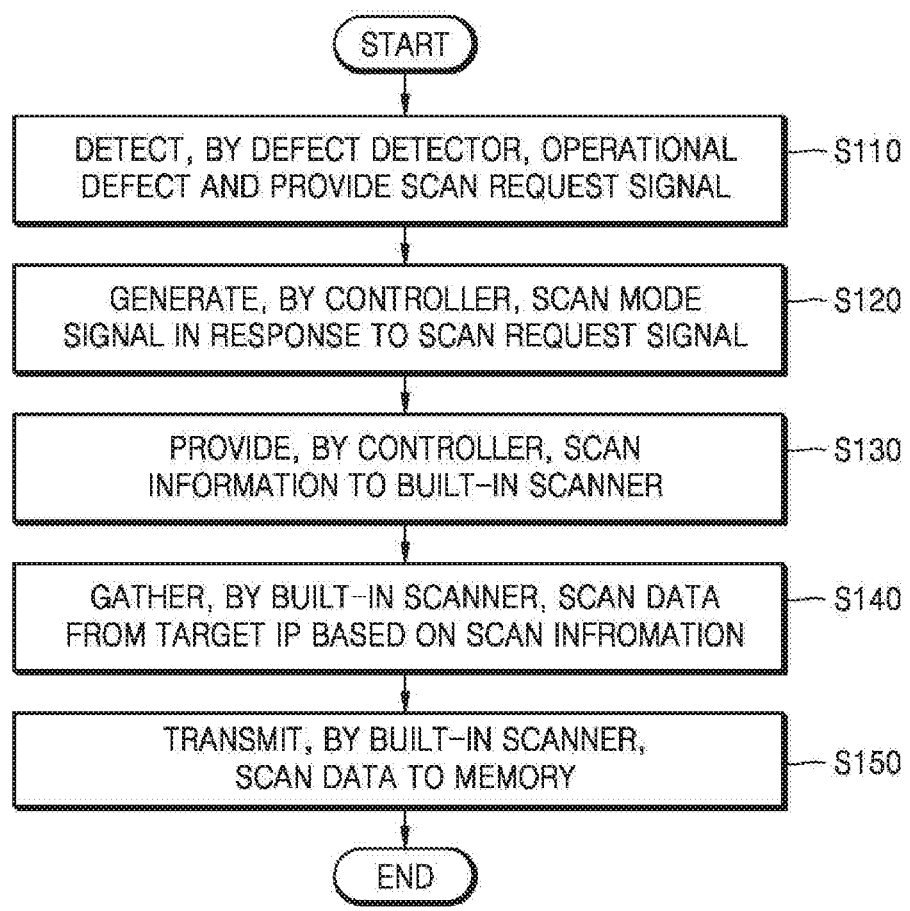
FIG. 4B is a flowchart of an operation of the IC shown in FIG. 4A.

FIG. 4A is a block diagram of an IC 10a according to an embodiment, and FIG. 4B is a flowchart of an operation of the IC 10a of FIG. 4A.

Referring to FIG. 4A, the IC 10a may include a plurality of IPs (e.g., first and second IPs IP1 and IP2), a controller 100, a built-in scanner 200, a defect detector 400, and a memory 20. In an embodiment, the memory 20 may be provided outside the IC 10a. For example, it will be assumed that the first IP IP1 is a GPU and the second IP IP2 is a display interface. The IC 10a may further include other components of the IC 10 described with reference to FIG. 1. Descriptions provided with reference to FIG. 1 may be applied to the present embodiment.

Each of the GPU IP1 and the display interface IP2 may include a test logic TL. As described above with reference to FIG. 3, the test logic TL may be connected to flip-flops included in the first and second IPs IP1 and IP2 to form a scan chain.

Referring to FIGS. 4A and 4B, the defect detector 400 may sense an operational defect in the IC 10a. If the operational defect is detected, the defect detector 400 may provide a scan request signal Req_SC to the controller 100 (S110). The defect detector 400 may be embodied by hardware or software. In an embodiment, the defect detector 400 may be embodied in the controller 100.

In an example, the defect detector 400 may include a timer. The timer may count a response time of at least one IP configured to operate in response to a specific command, and detect the occurrence of an operational defect when a count value exceeds a critical value. For example, various IPs including the GPU IP1 and the display interface IP2 may operate in response to a command to request an operation of a display device. The timer may count a response time of the IPs and detect operational defects in IPs related to the IC 10a or the display device when a count value exceeds a critical value.

In another example, the defect detector 400 may sense a signal generated by a reset button included in an electronic device in which the IC 10a is mounted, and detect an operational defect.

In another example, the defect detector 400 may be embodied by a portion of a PMU included in the IC 10a. The defect detector 400 may detect an operational defect based on power consumption of IPs. For example, the defect detector 400 may sense the occurrence of an operational defect when power consumption of an IP configured to operate in response to a command is excessively high or low. In addition, the defect detector 400 may be embodied by various circuits or modules.

The controller 100 may generate a scan mode signal SMODE in response to a scan request signal Req_SC (S120). The controller 100 may provide the scan mode signal SMODE to the plurality of IPs IP1 and IP2 and the built-in scanner 200. The IPs IP1 and IP2 and the built-in scanner 200 may enter a scan mode. For example, the built-in scanner 200 may be enabled in response to the scan mode signal SMODE. Operations of the IPs IP1 and IP2 may be stopped in response to the scan mode signal SMODE.

The controller 100 may provide scan information SIFM to the built-in scanner 200 (S130). For example, the scan information SIFM may include information of a target IP, a length of a scan chain included in the target IP (e.g., the number of bytes of information contained in the scan chain), and address information of a storage region of the memory 20 in which gathered scan data SCDATA will be stored.

The built-in scanner 200 may gather scan data SCDATA from the target IP based on the scan information SIFM (S140). The built-in scanner 200 may provide a scan clock signal SCK, scan input data SIN, and a scan enable signal SE to the test logic TL of the target IP. Data may be shifted and output from the flip-flop of the target IP in response to the scan clock signal SCK. The built-in scanner 200 may receive, as the scan data SCDATA, data (e.g., first and second output data SDO1 and SDO2) from the test logic TL of the target IP. In an embodiment, the built-in scanner 200 may convert a format of the gathered scan data SCDATA into a format appropriate for a communication protocol with the memory 20. The built-in scanner 200 may transmit the scan data SCDATA to the memory 20 (S150).

Figure 5A:
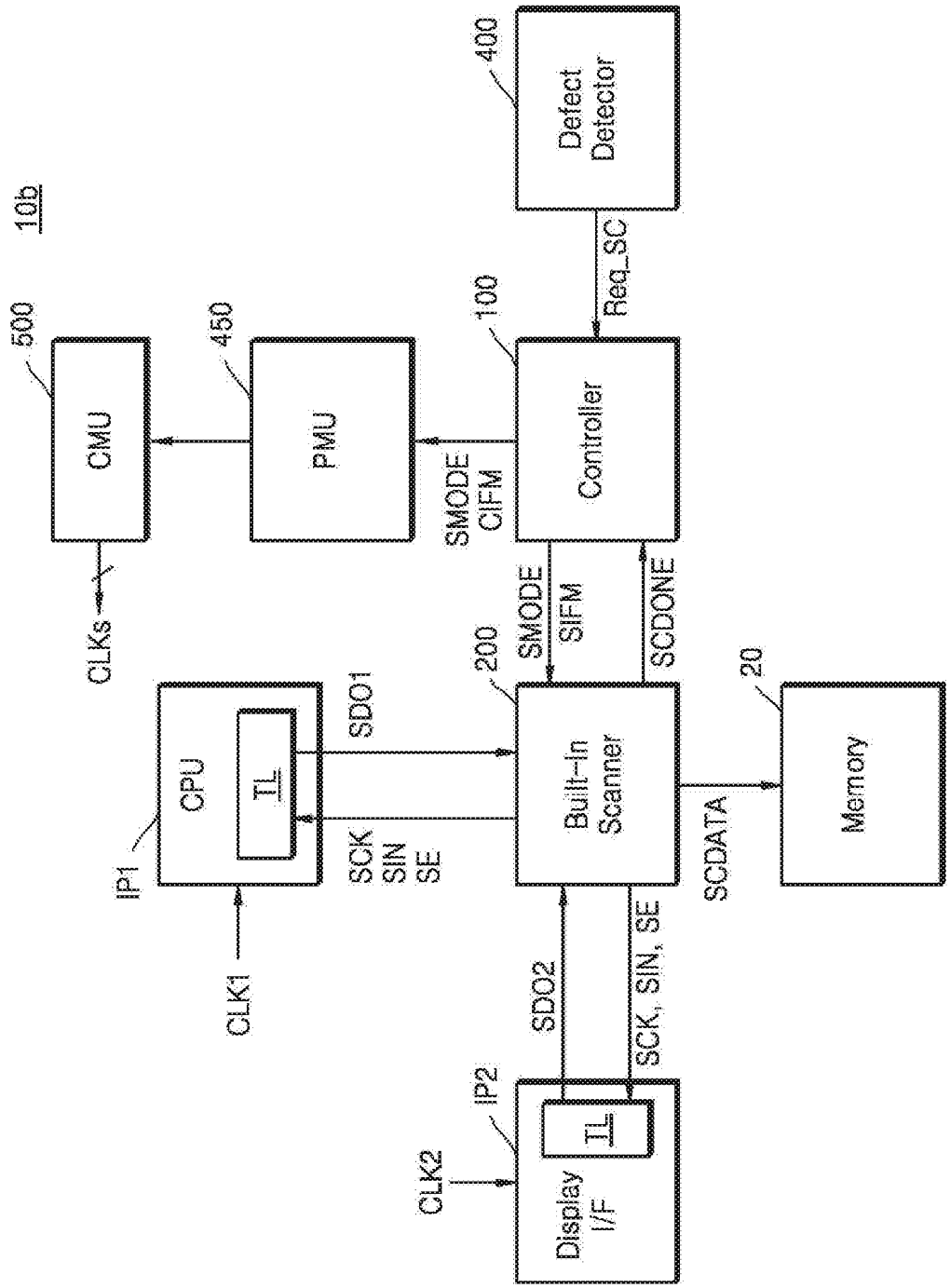
FIG. 5A is a block diagram of an IC according to an embodiment.
Figure 5B:
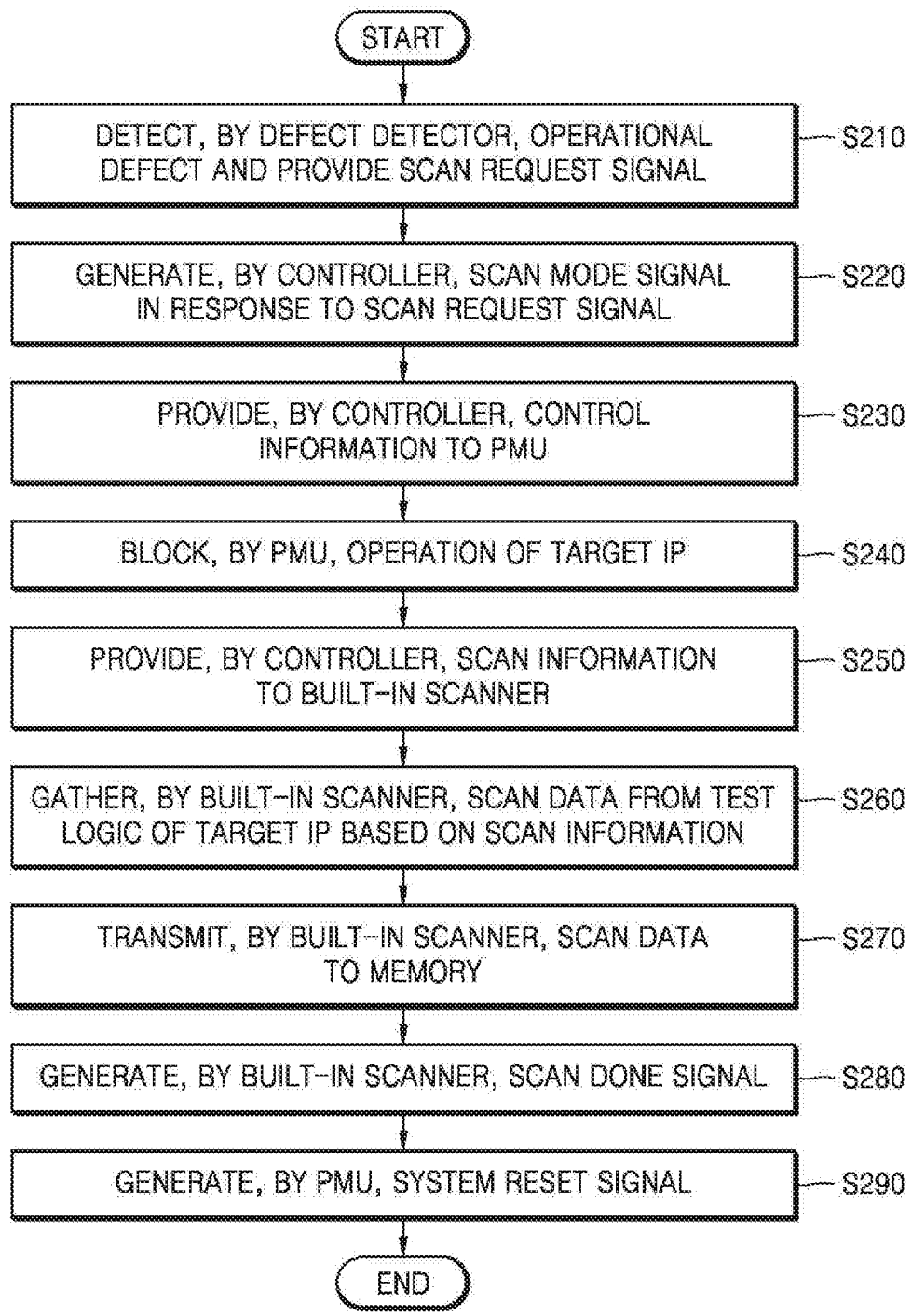
FIG. 5B is a flowchart of an operation of the IC shown in FIG. 5A.

FIG. 5A is a block diagram of an IC 10b according to an embodiment, and FIG. 5B is a flowchart of an operation of the IC 10b of FIG. 5A.

Referring to FIG. 5A, the IC 10b may include a plurality of IPs (e.g., IPs IP1 and IP2), a controller 100, a built-in scanner 200, a defect detector 400, a memory 20, a PMU 450, and a CMU 500. In an embodiment, the memory 20 may be provided outside the IC 10b.

Since operations of the IPs IP1 and IP2, the controller 100, the built-in scanner 200, the defect detector 400, and the memory 20 are the same as described above with reference to FIG. 4A, repeated descriptions will be omitted.

The PMU 450 may generally manage power of the IC 10b. The PMU 450 may manage powers of components (e.g., the IPs IP1 and IP2, the controller 100, the built-in scanner 200, the defect detector 400, and the CMU 500) included in the IC 10b. In addition, the PMU 450 may control operations of the components included in the IC 10b.

The CMU 500 may generate a plurality of clock signals CLKs and provide each of the plurality of clock signals CLKs to the corresponding IP. For example, a first clock signal CLK1 may be provided to a CPU IP1, and a second clock signal CLK2 may be provided to a display interface IP2. Frequencies and/or phases of the first clock signal CLK1 and the second clock signal CLK2 may be equal or different. When the IC 10b is in a normal mode, the CPU IP1 and the display interface IP2 may perform normal operations in response to the first and second clock signals CLK1 and CLK2.

In an embodiment, the CMU 500 may provide a clock signal to the built-in scanner 200. The built-in scanner 200 may generate the scan clock signal SCK in response to the clock signal generated by the CMU 500. However, the disclosure is not limited thereto, and the built-in scanner 200 may include a debugging clock generator configured to generate a scan clock signal SCK.

Referring to FIG. 5B, the defect detector 400 may sense an operational defect in the IC 10b. If the operational defect is detected, the defect detector 400 may provide a scan request signal Req_SC to the controller 100 (S210).

The controller 100 may generate a scan mode signal SMODE in response to the scan request signal Req_SC (S220). The controller 100 may provide the scan mode signal SMODE to the IPs IP1 and IP2, the built-in scanner 200, and the PMU 450.

The controller 100 may provide control information CIFM to the PMU 450 (S230). For example, the control information CIFM may include information of a target IP.

The PMU 450 may block an operation of the target IP (S240). For example, the PMU 450 may block an operation of the CMU 500 by controlling the clock gating of the target IP. The CMU 500 may include a plurality of clock generators (e.g., phase locked loops (PLLs) or delay locked loops (DLLs)) configured to generate a plurality of clock signals CLKs, respectively. The PMU 450 may cut off power applied to a clock generator configured to generate a clock signal provided to the target IP and control the clock gating of the target IP. However, the disclosure is not limited thereto, and the PMU 450 may block an operation of the target IP in various manners according to a set function of the PMU 450.

The controller 100 may provide scan information SIFM to the built-in scanner 200 (S250), and the built-in scanner 200 may gather scan data SCDATA from a test logic TL of the target IP based on the scan information SIFM (S260). The built-in scanner 200 may transmit the gathered scan data SCDATA to the memory 20 (S270). Since operations S250 to S270 are substantially the same as operations S130 to S150 of FIG. 4B, detailed descriptions thereof will be omitted.

If the scan data SCDATA is completely gathered and stored, the built-in scanner 200 may provide a scan done signal SCDONE to the controller 100 (S280). The controller 100 may inform the PMU 450 that that the controller 100 has received the scan done signal SCDONE. Alternatively, the PMU 450 may monitor the controller 100 and sense that the controller 100 has received the scan done signal SCDONE.

The PMU 450 may generate a system reset signal (S290). Components included in the IC 10b may be reset in response to the system reset signal. The IC 10b may operate in a normal mode. However, the memory 20, in which the scan data SCDATA is stored, may not be reset. The memory 20 may maintain the scan data SCDATA.

In an embodiment, the PMU 450 and the CMU 500 may also include test logics TL. For example, the PMU 450 may include a plurality of management circuits having respective functions. In a scan mode, management circuits except at least some management circuits related to scan operations, from among the plurality of management circuits included in the PMU 450, may correspond to target IPs.

Figure 6:
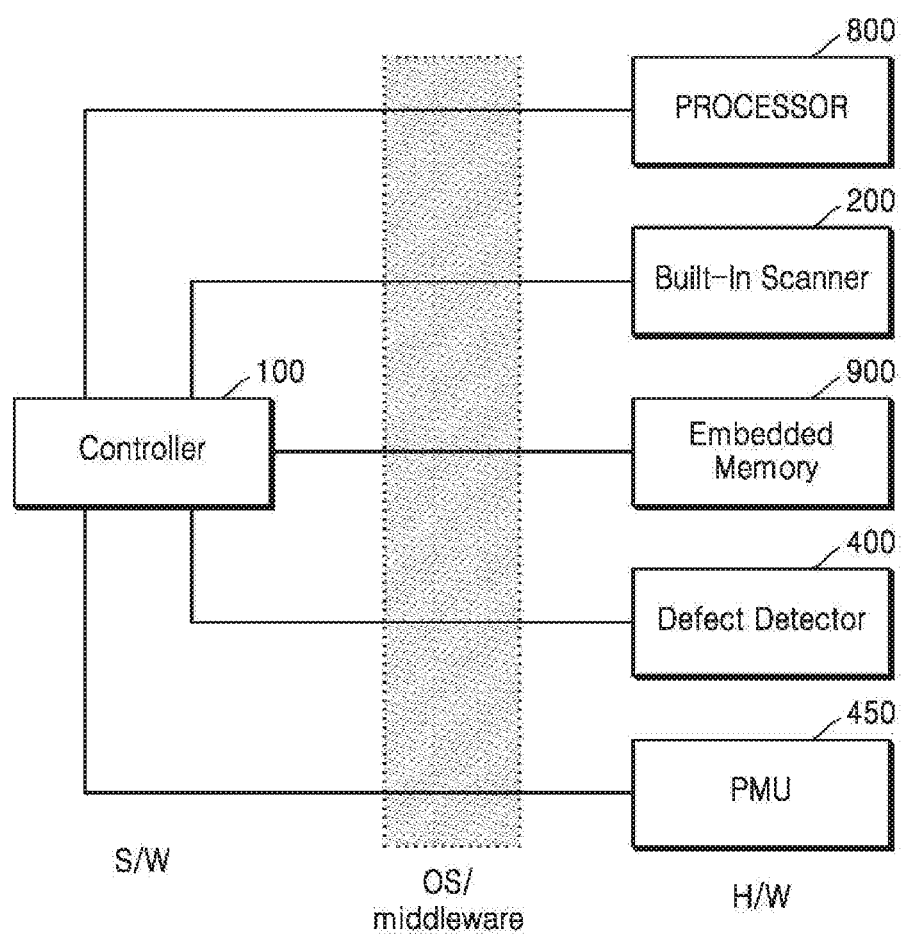
FIG. 6 is a block diagram showing relationships between a controller and other components, according to an embodiment.

FIG. 6 is a block diagram showing relationships between a controller 100 and other components, according to an embodiment.

Referring to FIG. 6, the controller 100 may be embodied by software S/W or firmware. The controller 100 may be embodied by a program code and mounted in an embedded memory 900. If the IC (refer to 10 in FIG. 1) is powered on, the controller 100 may be executed by a processor 800. For instance, the processor 800 may include an MP or a CPU.

The processor 800, the built-in scanner 200, the embedded memory 900, the defect detector 400, and the PMU 450 may be embodied by hardware H/W. An operating system (OS) and middleware may be between the controller 100 and other components.

Figure 7:
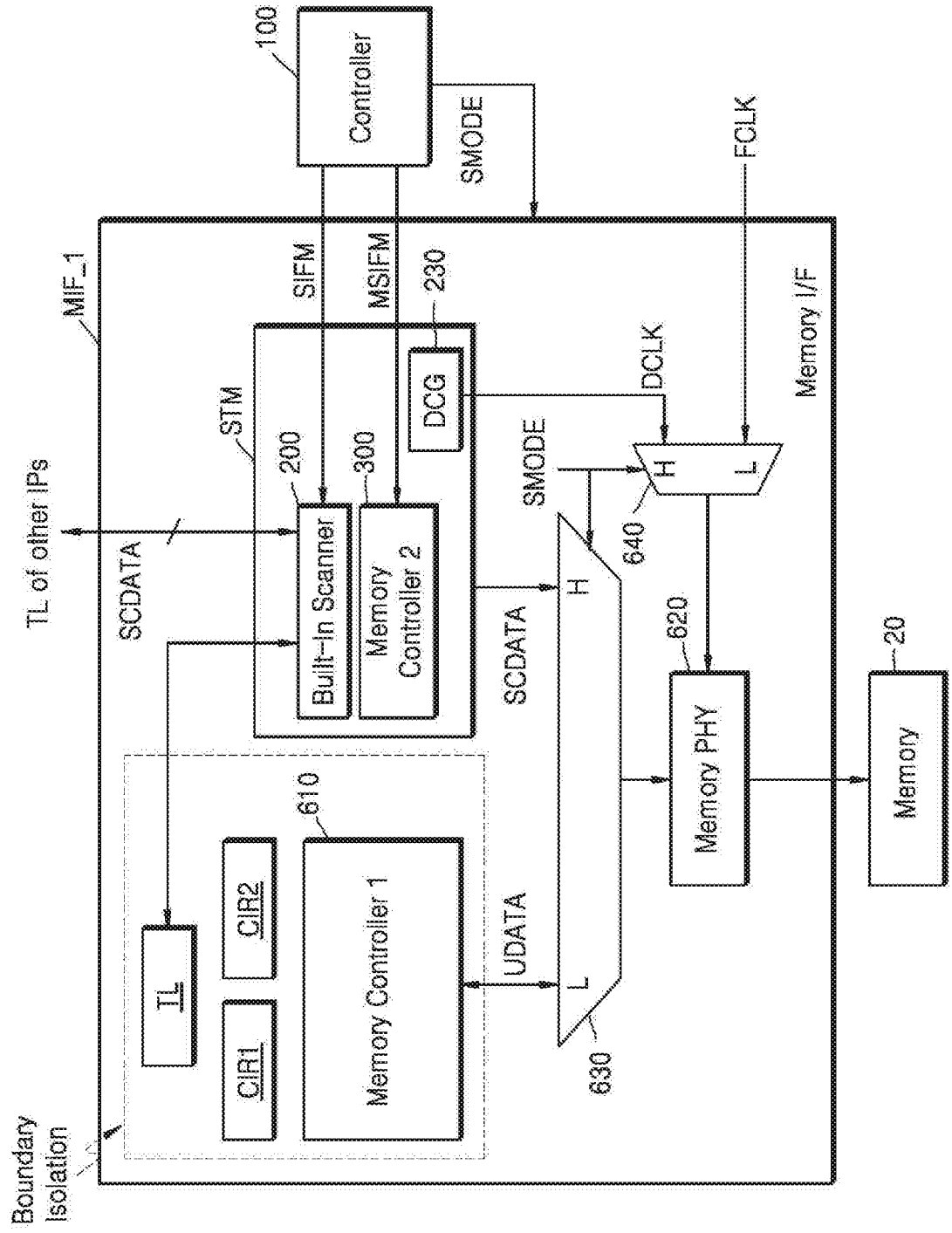
FIG. 7 is a block diagram of a memory interface according to an embodiment.

FIG. 7 is a block diagram of a memory interface MIF_1 according to an embodiment.

Referring to FIG. 7, the memory interface MIF_1 may include a first memory controller 610, a built-in scanner 200, a second memory controller 300, a debugging clock generator 230, a memory physical layer 620, a first selector 630, and a second selector 640. Also, the memory interface MIF_1 may further include a test logic TL and a plurality of function circuits (e.g., function circuits CIR1 and CIR2). In an embodiment, the built-in scanner 200, the second memory controller 300, and the debugging clock generator 230 may be embodied by a single module STM.

As compared with the memory interface MIF of FIG. 1, the memory interface MIF_1 of FIG. 7 may further include the second selector 640 and the debugging clock generator 230. Since operations of other components are similar to those described with reference to FIG. 1, detailed descriptions thereof will be omitted.

In the scan mode, the debugging clock generator 230 may generate a debugging clock signal DCLK in response to a reference clock signal provided from outside of the IC (refer to 10 in FIG. 1).

The second selector 640 may select one of a function clock signal FCLK and a debugging clock signal DCLK in response to a scan mode signal SMODE, and provide the selected clock signal to the memory physical layer 620. In this case, the function clock signal FCLK may be a clock signal provided by the CMU (refer to 500 in FIG. 5A) of the IC 10. In another embodiment, a clock signal provided to the memory physical layer 620 may be generated by an additional PLL. In this case, the second selector 640 may have a PLL setting function.

For example, the second selector 640 may select the debugging clock signal DCLK when the scan mode signal SMODE is logic high (H), and select the function clock signal FCLK when the scan mode signal SMODE is logic low (L). Accordingly, in a normal mode, the memory physical layer 620 may transmit user data UDATA to the memory 20 in response to the function block signal FCLK. Also, in a scan mode, the memory physical layer 620 may transmit scan data SCDATA to the memory 20 in response to the debugging clock signal DCLK.

In an embodiment, the debugging clock generator 230 may generate the scan clock signal (refer to SCK in FIG. 5A), and provide the scan clock signal SCK to the built-in scanner 200. The built-in scanner 200 may provide the scan clock signal SCK to a target IP. For example, the built-in scanner 200 may provide the scan clock signal SCK to the target IP (i.e., a test logic TL of the target IP) during a period set according to a length of a scan chain of the target IP.

As described above, the memory interface MIF_1 and the IC including the memory interface MIF_1 according to the present embodiment may include the debugging clock generator 230. In a scan mode, the debugging clock generator 230 may generate a debugging clock signal DCLK. In the scan mode, since scan data SCDATA is stored in the memory 20 in response to the debugging clock signal DCLK, even if an operation error occurs in the CMU 500, the scan data SCDATA may be stably stored in the memory 20.

Figure 8:
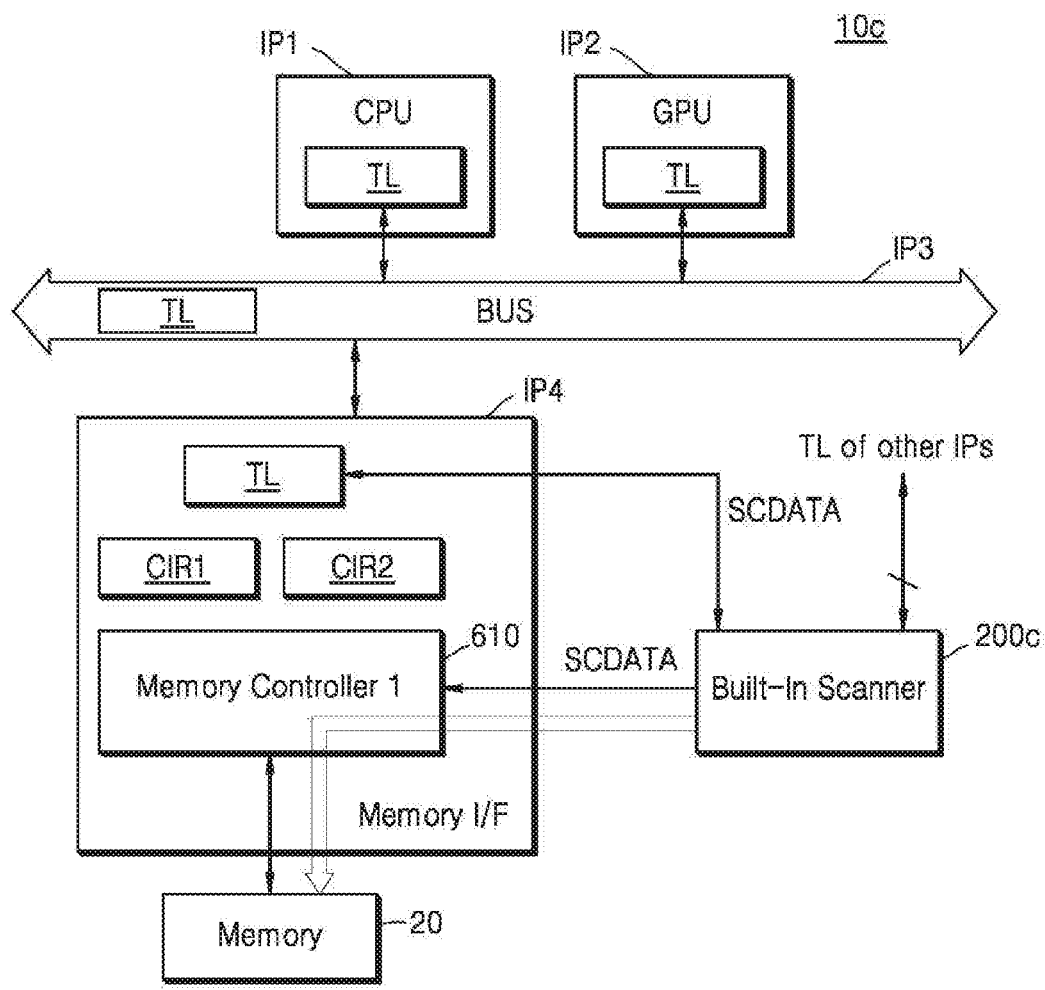
FIG. 8 is a block diagram of an IC according to an embodiment.

FIG. 8 is a block diagram of an IC 10c according to an embodiment.

Referring to FIG. 8, the IC 10c may include a plurality of IPs (e.g., first to fourth IPs IP1 to IP4) and a built-in scanner 200c. It will be assumed that the third and fourth IPs IP3 and IP4 are a bus and a memory interface.

When the IC 10c is in a scan mode, the built-in scanner 200c may gather scan data SCDATA from the IPs IP1 to IP4. The built-in scanner 200c may gather the scan data SCDATA based on scan information provided by the controller (refer to 100 in FIG. 1). The built-in scanner 200c may be point-to-point connected to the IPs IP1 to IP4. The built-in scanner 200c may gather the scan data SCDATA from the IPs IP1 to IP4 by point-to-point connections.

The built-in scanner 200c may provide the gathered scan data SCDATA to the first memory controller 610. In this case, the built-in scanner 200c may directly provide the scan data SCDATA to the first memory controller 610 without passing through a bus IP3. The first memory controller 610 may transmit the scan data SCDATA to the memory 20. In other words, the built-in scanner 200c may store the scan data SCDATA in the memory 20 through the first memory controller 610.

Figure 9:
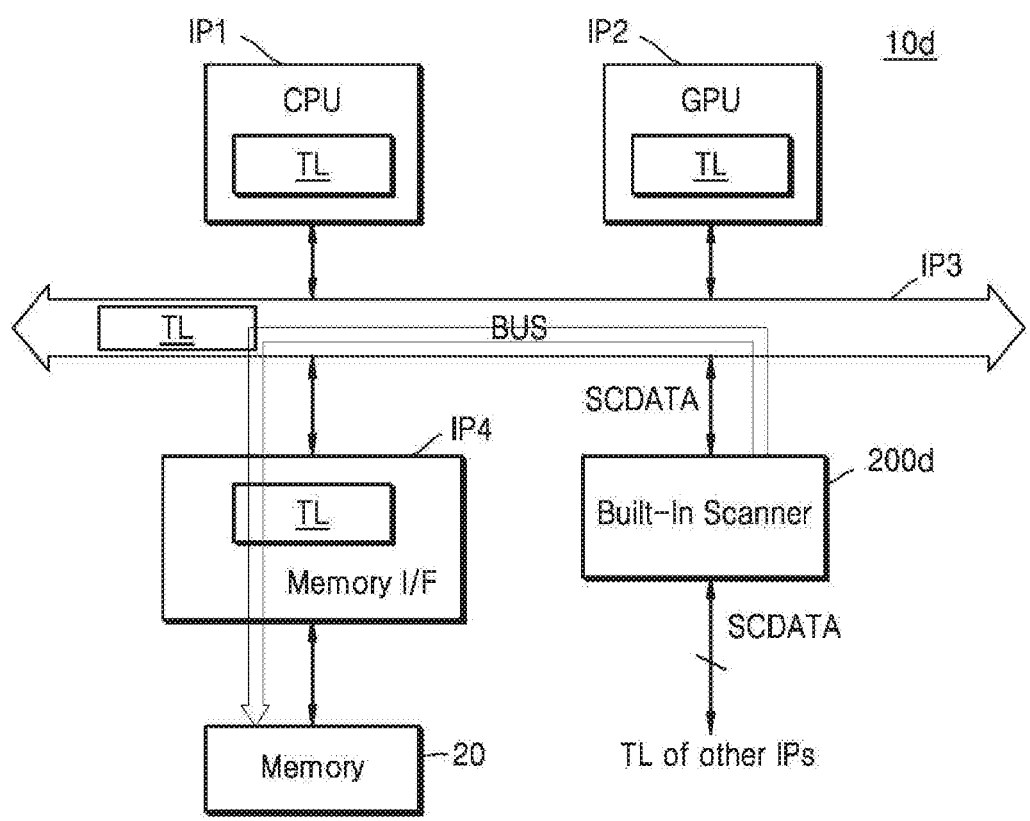
FIG. 9 is a block diagram of an IC according to an embodiment.

FIG. 9 is a block diagram of an IC 10d according to an embodiment.

Referring to FIG. 9, the IC 10d may include a plurality of IPs (e.g., first to fourth IPs IP1 to IP4) and a built-in scanner 200d. It will be assumed that the third and fourth IPs IP3 and IP4 are a bus and a memory interface, respectively.

In the present embodiment, the built-in scanner 200d may be connected to the bus IP3. The built-in scanner 200d may also be point-to-point connected to the IPs IP1 to IP4. In a scan mode, the built-in scanner 200d may gather scan data SCDATA from the IPs IP1 to IP4 by point-to-point connections, and transmit the gathered scan data SCDATA to the memory interface IP4 through the bus IP3. The memory interface IP4 may transmit the scan data SCDATA to the memory 20. In other words, the built-in scanner 200d may store the scan data SCDATA in the memory 20 through the bus IP3 and the memory interface IP4.

Figure 10:
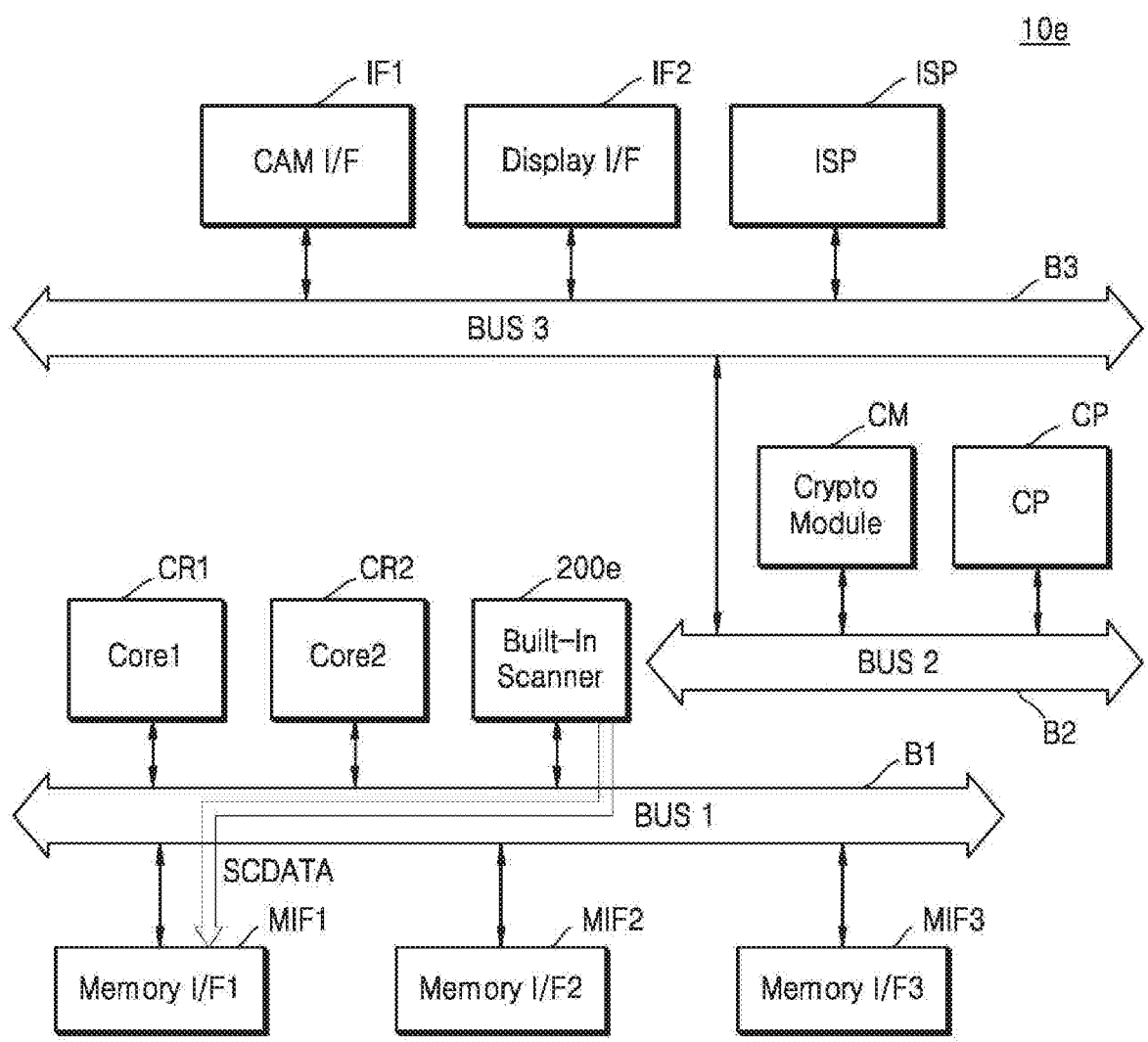
FIG. 10 is a block diagram of an IC according to an embodiment.

FIG. 10 is a block diagram of an IC 10e according to an embodiment.

Referring to FIG. 10, the IC 10e may include a plurality of IPs and a built-in scanner 200e. For example, the plurality of IPs may include first to third buses B1, B2, and B3, first and second cores CR1 and CR2, first to third memory interfaces MIF1, MIF2, and MIF3, a crypto module CM, a communication processor CP, a camera interface IF1, a display interface IF2, and an image signal processor (ISP). The plurality of IPs may include test logics.

The IC 10e may have a hierarchical bus structure. For example, as shown in FIG. 10, elements included in the IC 10e may transmit or receive data to or from one another through a hierarchical bus embodied by the first to third buses B1, B2, and B3.

In an embodiment, IPs that are closely related to one another in functional aspects may be connected to the same bus. For example, the first and second cores CR1 and CR2 and the first to third memory interfaces MIF1, MIF2, and MIF3 that are related to the control of general operations of the IC 10e and the storage of data may be connected to the first bus B1. For example, the first bus B1 may be a system bus. The crypto module CM and the communication processor CP that are related to communication and a security function of the IC 10e may be connected to the second bus B2. The camera interface IF1, the display interface IF2, and the ISP may be connected to the third bus B3. For example, the second and third buses B2 and B3 may be expansion buses. However, the disclosure is not limited thereto, and connection relationships between IPs and buses may be variously changed in consideration of data traffic.

The built-in scanner 200e may be connected to the first bus B1. The built-in scanner 200e may transmit the gathered scan data to one of the first to third memory interfaces MIF1, MIF2, and MIF3 through the first bus B1. For example, the built-in scanner 200e may transmit the scan data to the first memory interface MIF1 through the first bus B1, and the first memory interface MIF1 may transmit the scan data to a memory corresponding thereto. Thus, the built-in scanner 200e may store the scan data in the memory through the first bus B1 and the first memory interface MIF1.

Figure 11:
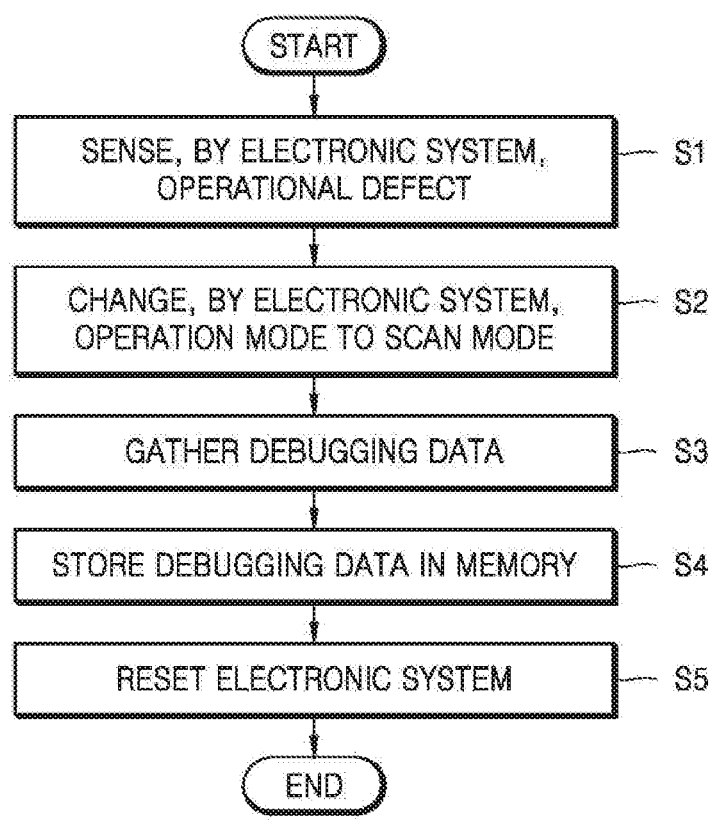
FIG. 11 is a flowchart of an operation of an electronic system according to an embodiment.

FIG. 11 is a flowchart of an operation of an electronic system according to an embodiment. The operation of the electronic system according to the present embodiment may be applied to the electronic system 1000 of FIG. 1. Also, the operation of an electronic system may be applied to electronic systems on which the ICs 10a, 10b, 10c, 10d, and 10e of FIGS. 4A, 5A, and 8 to 10 are mounted.

Referring to FIG. 11, the electronic system 1000 may sense an operational defect during a normal operation (S1). The electronic system 1000 may sense an internal signal or an external signal and detect an operational defect. For example, the IC (refer to 10 in FIG. 1) may count a response time of at least one IP configured to perform an operation in response to a command, and sense the occurrence of the operational defect when a count value exceeds a critical value. Alternatively, the IC 10 may sense an operational defect due to a signal transmission device when an operation that is predefined as a malfunction occurs. In another example, an electronic device on which the electronic system 1000 is mounted may include a button having a reset function. When a user of the electronic device presses the button, the electronic system 1000 may sense that an operational defect has occurred.

The electronic system 1000 may change an operation mode to a scan mode (S2). The electronic system 1000 may be changed from a normal mode to the scan mode. For example, the controller (refer to 100 in FIG. 1) may generate a scan mode signal SMODE, and the IPs IP1 to IP4 and the built-in scanner (refer to 200 in FIG. 1) may enter the scan mode in response to the scan mode signal SMODE. Operations of the IPs IP1 to IP4 may be stopped. Before the operations of the IPs IP1 to IP4 are stopped, values indicating operation states of the IPs IP1 to IP4 may be stored in registers included in the IPs IP1 to IP4.

The built-in scanner 200 may be in an inactive state (e.g., an idle state), while the electronic system 1000 is performing a normal operation. The built-in scanner 200 may be enabled in response to the scan mode signal SMODE.

Thereafter, the built-in scanner 200 may gather debugging data (e.g., scan data) from the IPs IP1 to IP4 (S3). The built-in scanner 200 may scan a test logic TL included in each of the IPs IP1 to IP4 based on scan information SIFM provided by the controller 100, and gather debugging data.

The built-in scanner 200 may store the gathered debugging data in a memory (S4). The built-in scanner 200 may provide a data write command, debugging data, and address information to the memory. The built-in scanner 200 may directly or indirectly access the memory (refer to 20 in FIG. 1) and store debugging data in the memory 20.

In an embodiment, operations S3 and S4 may be alternately and repeatedly performed. For example, the built-in scanner 200 may gather debugging data of a target IP in predetermined units (e.g., 64 bits) of data and store the debugging data in the memory 20.

If the debugging data is stored in the memory 20, the electronic system 1000 may be reset (S5). The IPs IP1 to IP4 may be reset and perform a normal operation. The built-in scanner 200 may be disabled. When the controller 100 is embodied by hardware, the controller 100 may be disabled or operate in a low-power mode. When the controller 100 is embodied by software and a processor, the processor may perform a normal operation.

Figure 12A:
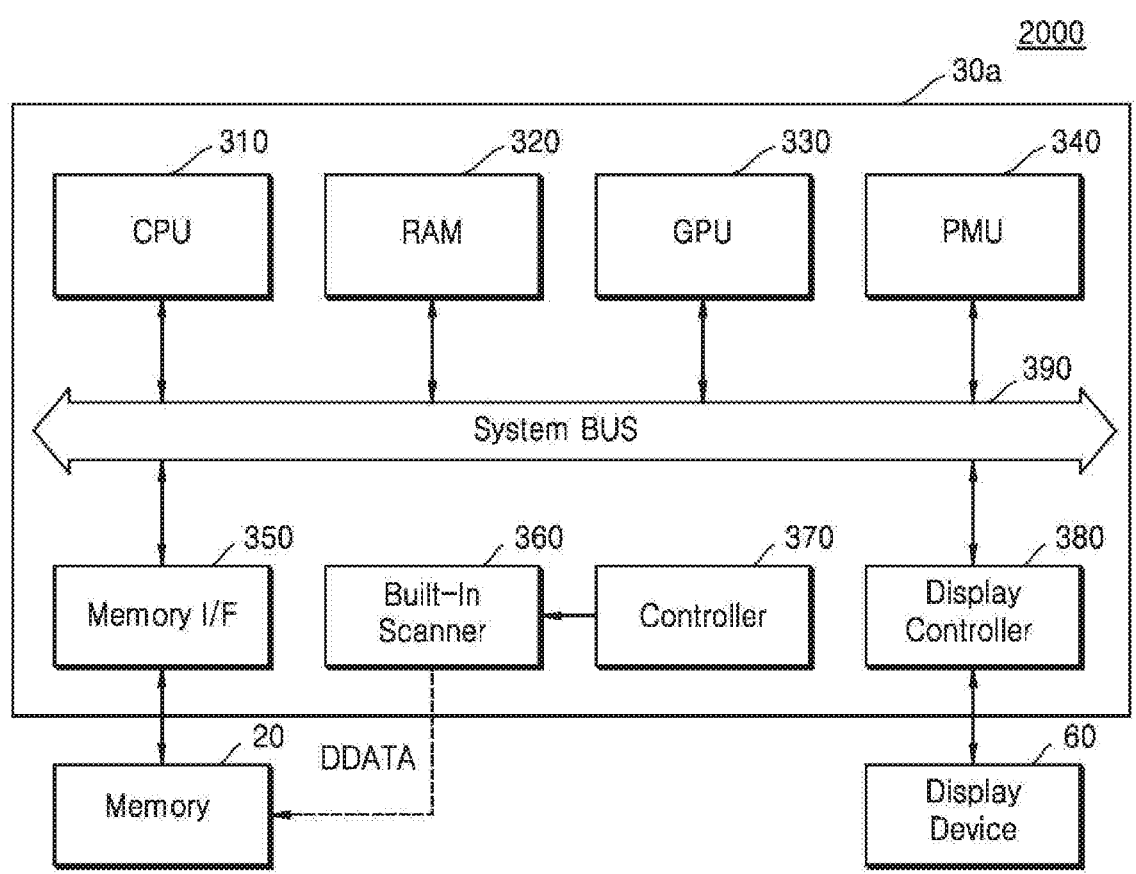
FIGS. 12A to 12C are block diagrams of an electronic device according to an embodiment.
Figure 12B:
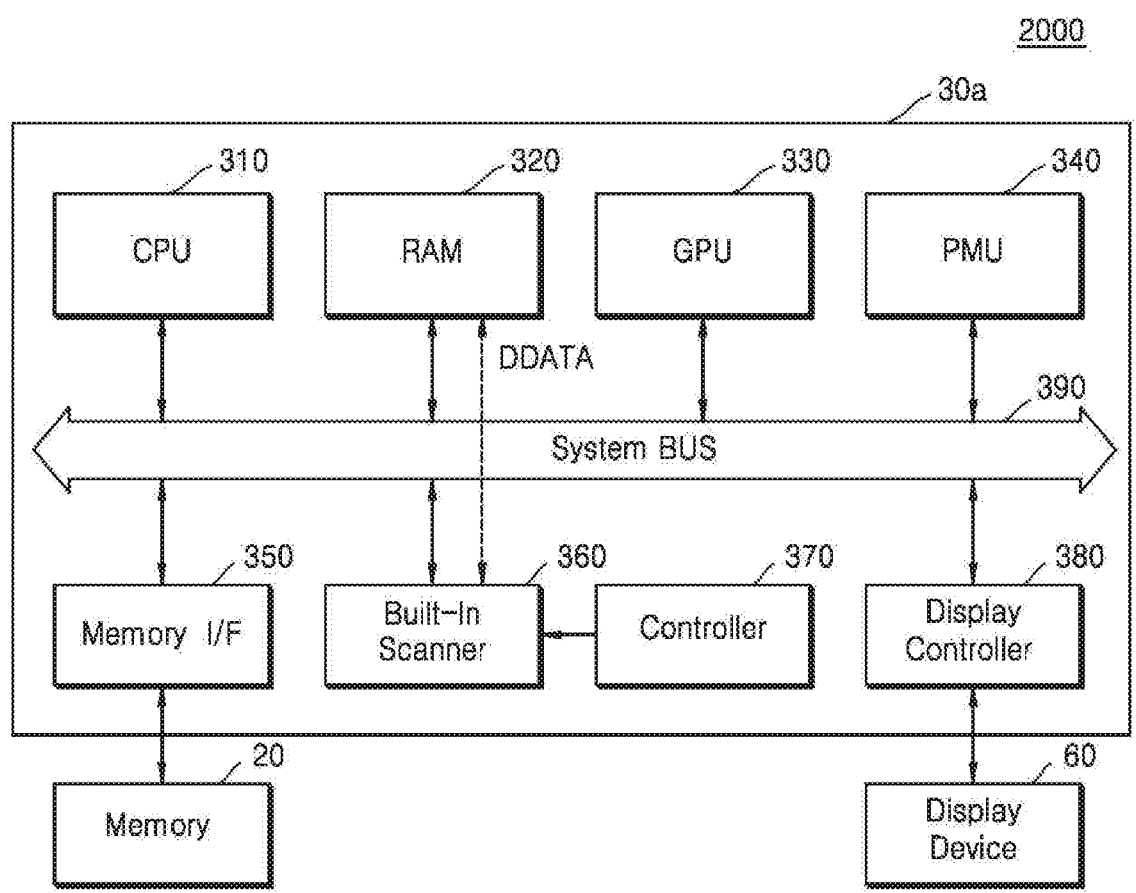
Figure 12C:
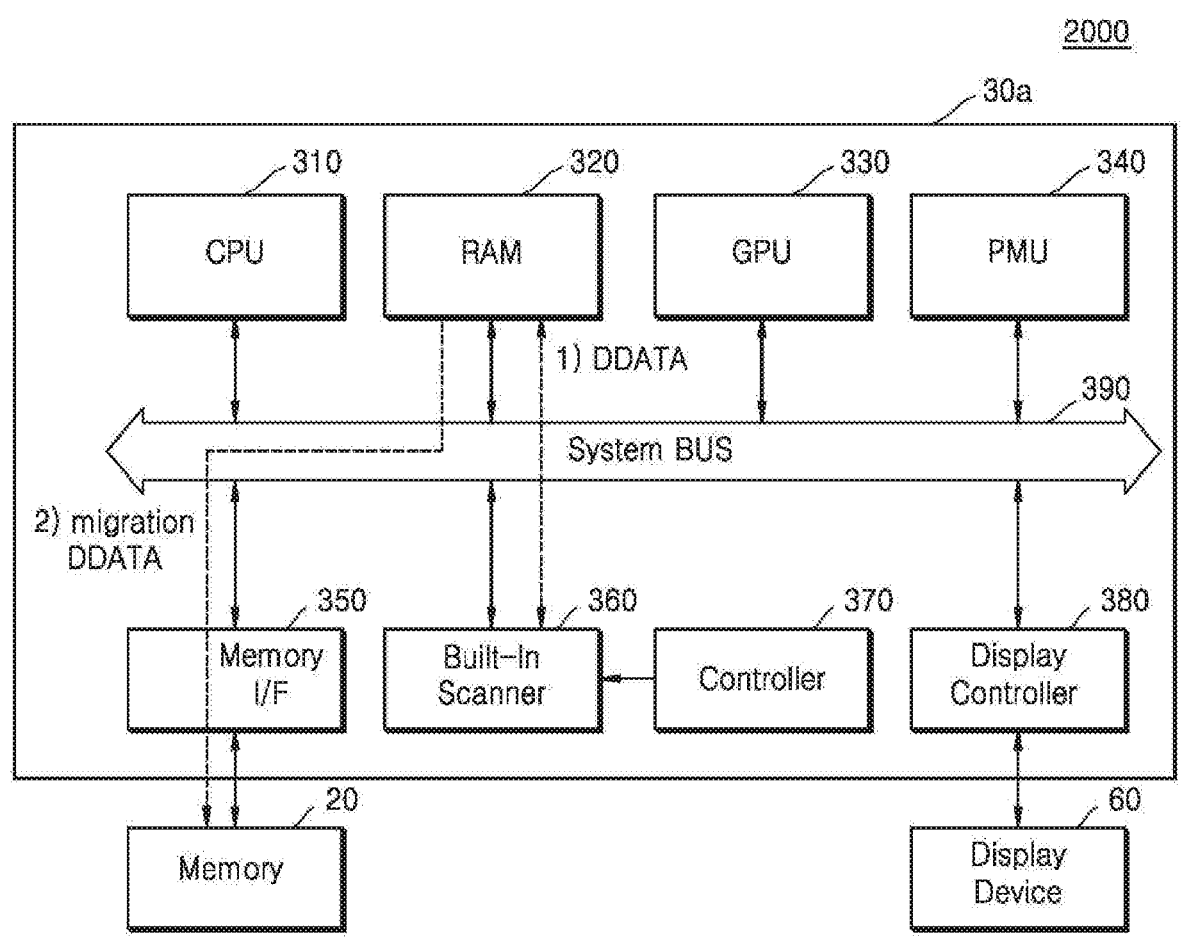

FIGS. 12A to 12C are block diagrams of an electronic device 2000 according to an embodiment. The electronic device 2000 may include an IC 30a, a memory 20, and a display device 60. In addition, the electronic device 2000 may further include various components. For example, when the electronic device 2000 is a portable terminal, the electronic device 2000 may further include a lens, an image sensor, an antenna, a transceiver, a modem, a microphone, a speaker, a touch input unit, and/or various kinds of sensors.

The IC 30a may include a CPU 310, RAM 320, a GPU 330, a PMU 340, a memory interface 350, a display controller 380, a built-in scanner 360, a controller 370, and a bus 390. In addition, the IC 30a may further include various IPs.

The CPU 310 may generally control operations of the IC 30a and the electronic device 2000. The CPU 310 may control an operation of each of the components 320 to 380 of the IC 30a. In an embodiment, the CPU 310 may be embodied by a multi-core. The multi-core may be a single computing component having two or more independent cores.

The RAM 320 may temporarily store programs, data, or instructions. For example, the programs and/or the data stored in the memory 20 may be temporarily stored in the RAM 320 under the control of the CPU 310 or according to a booting code. The RAM 320 may be embodied by DRAM or SRAM.

The GPU 330 may perform operations related to a graphics processing operation.

The PMU 340 may manage power of each of the components 310 to 380 of the IC 30a. Also, the PMU 340 may determine an operational status of each of the components 310 to 380 and control an operation of each of the components 310 to 380.

The memory interface 350 may generally control an operation of the memory 20 and control data exchange between each of the components 310 to 380 of the IC 30a and the memory 20. The memory interface 350 may write data to the memory 20 or read data from the memory 20 at the request of the CPU 310.

The built-in scanner 360 may gather debugging data DDATA from the components 310, 320, 330, 340, 350, 380, and 390 of the IC 30a, and store the gathered debugging data DDATA to the memory 20. As described above with reference to FIG. 1, the debugging data DDATA may be scan data.

When a defect occurs in operation of the IC 30a, the controller 370 may gather and store debugging data DDATA and control a general operation of rebooting the IC 30a.

The display controller 380 may control an operation of the display device 60 and transmit image data to the display device 60. For example, the display controller 380 may change a format of image data provided by the GPU 330 or perform an image processing operation and transmit the image data to the display device 60.

The components 310 to 380 of the IC 30a may internally transmit and receive data to and from one another through the system bus 390.

The memory 20, which is a data storage, may store an operating system (OS), various programs, and various kinds of data. The memory 20 may be located outside the IC 30a.

The display device 60 may display the received image data. The display device 60 may be embodied by a flat panel display (FPD) or a flexible display, such as a liquid crystal display (LCD), a light-emitting diode (LED) display, or an organic LED (OLED) display.

Referring to FIG. 12A, the electronic device 2000 may store the debugging data DDATA in the memory 20 included outside the IC 30a. For example, the memory 20 may be DRAM. However, the disclosure is not limited thereto, and the memory 20 may be a non-volatile memory device (e.g., flash memory, PRAM, MRAM, ReRAM, or FeRAM).

In an embodiment, as described above with reference to FIG. 1, the built-in scanner 360 may directly transmit debugging data DDATA to the memory 20. In another embodiment, the built-in scanner 360 may transmit the debugging data DDATA to the memory 20 through the memory interface 350 as described with reference to FIG. 8. Alternatively, the built-in scanner 360 may transmit the debugging data DDATA to the memory 20 through the bus 390 and the memory interface 350 as described with reference to FIG. 9.

Referring to FIG. 12B, the electronic device 2000 may store debugging data DDATA in a memory (e.g., the RAM 320) included in the IC 30a. The built-in scanner 360 may directly transmit debugging data DDATA to the RAM 320 or transmit the debugging data through the bus 390 so that the debugging data DDATA may be stored in the RAM 320.

Referring to FIG. 12C, the electronic device 2000 may temporarily store the debugging data DDATA in a memory (e.g., the RAM 320) included in the IC 30a. After the IC 30a is reset, the electronic device 2000 may store the debugging data DDATA in the memory 20 located outside the IC 30a.

The built-in scanner 360 may directly transmit debugging data DDATA to the RAM 320 or transmit the debugging data DDATA to the RAM 320 through the bus 390 so that the debugging data DDATA may be stored in the RAM 320.

If the debugging data DDATA is stored in the RAM 320, the PMU 340 may generate a system reset signal. The IC 30a may be reset in response to the system reset signal. In this case, the RAM 320 may not be reset but maintain the stored data. The built-in scanner 360 and the controller 370 may enter an idle state. In an embodiment, when the controller 370 is embodied by software, a processor (e.g., the CPU 310), or another processor, the processor may perform a normal operation.

The CPU 310 may read the debugging data DDATA from the RAM 320 and store the debugging data DATA in the memory 20.

Figure 13:
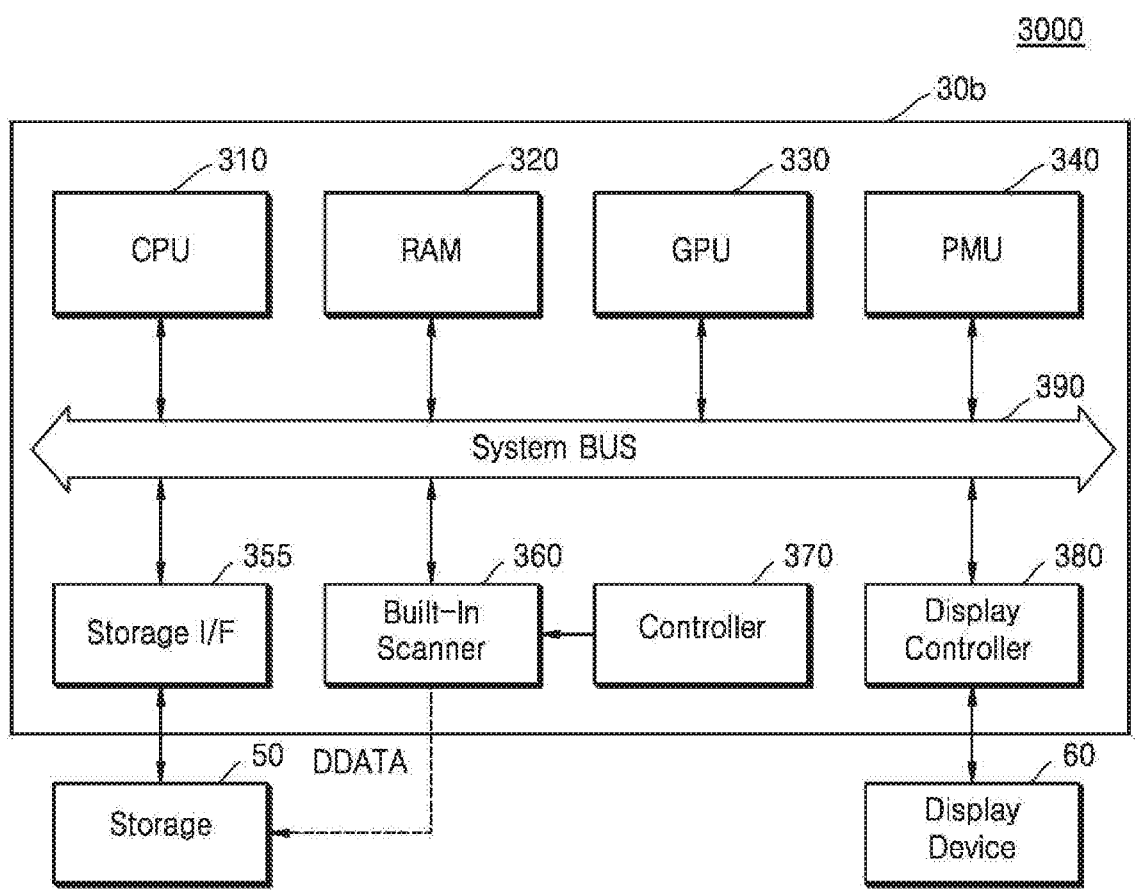
FIG. 13 is a block diagram of an electronic device according to an embodiment.

FIG. 13 is a block diagram of an electronic device 3000 according to an embodiment. The electronic device 3000 may include an IC 30b, a storage 50, and a display device 60.

The IC 30b may include a CPU 310, RAM 320, a GPU 330, a PMU 340, a storage interface 355, a display controller 380, a built-in scanner 360, a controller 370, and a bus 390.

The storage interface 355 may generally control operations of the storage 50 and write data to the storage 50 or read data from the storage 50 at the request of the CPU 310.

The storage 50, which is a data storage, may store a large amount of data. The storage 50 may be located outside the IC 30a. In an embodiment, the storage 50 may be easily detached from the electronic device 3000. For example, the storage 50 may include at least one of a memory card, a solid-state drive (SSD), a USB memory, and a hard disk drive (HDD).

The electronic device 3000 according to the present embodiment may store debugging data DDATA in the storage 50 located outside the IC 30b. The built-in scanner 360 may directly transmit the debugging data DDATA to the storage 50 or transmit the debugging data DDATA to the storage device 50 through the storage interface 355 and/or the bus 390 so that the debugging data DDATA may be stored in the storage 50.

Figure 14:
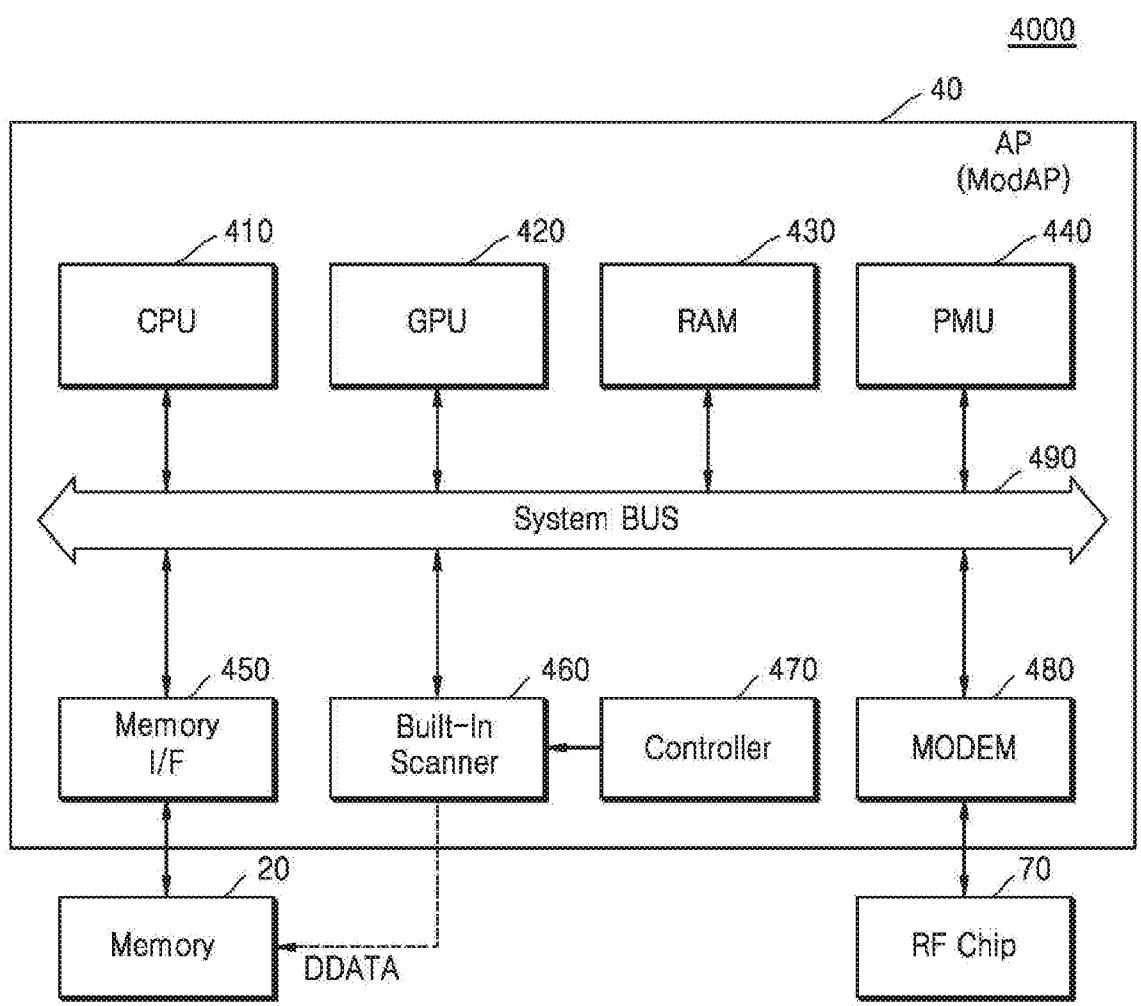
FIG. 14 is a block diagram of an application processor (AP) and an electronic device including the AP, according to an embodiment.

FIG. 14 is a block diagram of an AP 40 and an electronic device 4000 including the AP, according to an embodiment.

Referring to FIG. 14, the electronic device 4000 may include an AP 40, a memory 20, and an RF chip 70. In addition, the electronic device 3000 may further include various components.

The AP 40 may be embodied by a System on Chip (SoC) and include a CPU 410, a GPU 420, RAM 430, a PMU 440, a memory interface 450, a modem 480, a built-in scanner 460, a controller 470, and a bus 490. In addition, the AP 40 may further include various IPs. The AP 40 may be referred to as a ModAP because functions of a modem chip are integrated in the AP 40.

The modem 480 may convert data to be transmitted into data appropriate for wireless environments to enable wireless communication, and restore received data. The modem 480 may perform digital communication with the RF chip 70 located outside the electronic device 4000.

The RF chip 70 may receive a high-frequency signal via an antenna, convert the high-frequency signal into a low-frequency signal, and transmit the low-frequency signal to the modem 480. Also, the RF chip 70 may receive a low-frequency signal from the modem 480, convert the low-frequency signal into a high-frequency signal, and transmit the high-frequency signal to the outside of the electronic device 400 via the antenna. Also, the RF chip 70 may amplify or filter signals.

In a scan mode, the built-in scanner 460 included in the AP 40 may gather debugging data DDATA from components 410, 420, 430, 440, 450, 480, and 490 of the AP 40 and store the debugging data DDATA in a memory located inside or outside the AP 40. For example, the built-in scanner 460 may store the debugging data DDATA in the memory 20 located outside the AP 40 or stored in the RAM 420 included in the AP 40 or a register file including flip-flops.

The modem 480 may be designed to be appropriate for wireless environments (e.g., a wireless communication method) of a region in which the electronic device 4000 is used. When the region in which the electronic device 4000 is used is far from a region in which environments capable of debugging the AP 40 (e.g., ModAP) including the modem 480 are prepared, it may not be easy to debug the AP 40. However, the electronic device 4000 according to the present embodiment may gather debugging data DDATA and store the gathered debugging data DDATA without using an external debugger. Thus, the accuracy of the debugging data DDATA may be improved, and the reproduction of a defect generation status and a debugging operation may be facilitated.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. An integrated circuit comprising:
 a plurality of intellectual properties (IPs), each of the plurality of IPs comprises a test logic;
 a bus configured to be connected to the plurality of IPs;
 a first memory controller configured to control a first memory, receive data from at least one of the plurality of IPs through the bus, and provide the data to the first memory in a first operation mode;
a scanner configured to gather debugging data from at least one of the test logics of the plurality of IPs in a second operation mode; and
a second memory controller configured to control the first memory, receive the debugging data from the scanner and provide the debugging data, received from the scanner, to the first memory in the second operation mode, wherein
the scanner is connected to each of the plurality of IPs.

2. The integrated circuit of claim 1, further comprising a controller configured to provide a control signal indicating the second operation mode to the plurality of IPs and the scanner, in response to a scan request signal.

3. The integrated circuit of claim 2, further comprising a defect detector configured to detect a defect in operation of the integrated circuit and generate the scan request signal.

4. The integrated circuit of claim 2, wherein the controller provides scan information, for gathering the debugging data, to the scanner.

5. The integrated circuit of claim 4, wherein the scan information comprises at least one of target IP information for gathering the debugging data, test logic information of a target IP, and address information regarding a region of the first memory in which the debugging data will be stored.

6. The integrated circuit of claim 1, further comprising:
a debugging clock generator configured to generate a debugging clock signal in the second operation mode, wherein
the debugging data output by the second memory controller is transmitted to the first memory in response to the debugging clock signal.

7. The integrated circuit of claim 6, wherein the debugging clock generator generates the debugging clock signal in response to a reference clock signal provided from outside.

8. The integrated circuit of claim 6, wherein in the first operation mode, the scanner, the second memory controller, and the debugging clock generator are in an idle state.

9. The integrated circuit of claim 1, wherein:
each test logic constitutes a scan chain along with a plurality of scan flip-flops, and
the debugging data comprises scan data output by the scan chain.

10. The integrated circuit of claim 9, wherein the scanner provides a scan clock signal corresponding to a length of the scan chain to the test logic included in at least one target IP included in the plurality of IPs.

11. The integrated circuit of claim 1, wherein the scanner converts a format of the debugging data into a format of data appropriate for a protocol of the second memory controller.

12. The integrated circuit of claim 1, wherein the first memory is included in the integrated circuit.

13. The integrated circuit of claim 1, wherein the first memory comprises dynamic random access memory (DRAM) located outside the integrated circuit.

14. The integrated circuit of claim 1, further comprising:
a power management unit (PMU) configured to manage power provided to the plurality of IPs, wherein
the PMU blocks application of a clock signal to the plurality of IPs in the second operation mode and generates a system reset signal when the debugging data is completely gathered and stored.

15. An integrated circuit comprising:
a plurality of intellectual properties (IPs), each of the plurality of IPs comprises a scan chain;
a bus configured to be connected to the plurality of IPs;
a first memory controller configured to receive data from the plurality of IPs through the bus, transmit the data to a memory and control the memory to store the data, in a normal operation mode;
a built-in scanner configured to gather scan data from the scan chain of one or more of the IPs, transmit the scan data gathered from the scan chain of the one or more IPs to the memory and control the memory to store the scan data in a scan mode; and
a controller configured to control at least some of the plurality of IPs and the built-in scanner to enter the scan mode in response to a scan request signal, and provide scan information to the built-in scanner, wherein
built-in scanner is connected to each of the plurality of IPs.

16. The integrated circuit of claim 15, wherein the built-in scanner comprises a scanner configured to gather the scan data in the scan mode and a second memory controller configured to transmit the scan data to the memory in the scan mode.

17. The integrated circuit of claim 15, wherein:
the built-in scanner stores the scan data in the memory included in the integrated circuit, and
after the integrated circuit is reset, at least one of the plurality of IPs reads the scan data from the memory and stores the scan data, read from the memory, in an external memory of the integrated circuit.

18. The integrated circuit of claim 15, wherein:
each of the bus and the first memory controller comprises a scan chain, and
the built-in scanner further gathers the scan data from the bus and the first memory controller.

19. An application processor mounted on an electronic device including a memory, the application processor comprising:
a plurality of function blocks, each of the plurality of function blocks including a test logic;
a controller configured to output a scan mode signal, indicating an operation mode for gathering debugging data, and a scan control signal when an operational defect occurs in at least some of the plurality of functional blocks; and
a built-in scanner configured to gather the debugging data from the test logics included in the at least some function blocks, in response to the scan mode signal and the scan control signal, and transmit the debugging data to the memory and control the memory to store the debugging data, wherein:
the controller provides, to the built-in scanner, an address of the memory where the debugging data will be stored, and
the built-in scanner is connected to each of the plurality of function blocks.

* * * * *